US008675797B2

(12) United States Patent
Bogdan

(10) Patent No.: US 8,675,797 B2
(45) Date of Patent: Mar. 18, 2014

(54) REAL TIME PROCESSING SUPPORTED BY PROGRAMMABLE CONTROL UNIT

(71) Applicant: John W Bogdan, Ottawa (CA)

(72) Inventor: John W Bogdan, Ottawa (CA)

(73) Assignee: John W. Bogdan, Ottawa, Ontario (CA)

(*) Notice: Subject to any disclaimer, the term of this patent is extended or adjusted under 35 U.S.C. 154(b) by 0 days.

(21) Appl. No.: 13/745,767

(22) Filed: Jan. 19, 2013

(65) Prior Publication Data

US 2013/0182800 A1 Jul. 18, 2013

Related U.S. Application Data

(63) Continuation of application No. 12/489,399, filed on Jun. 22, 2009, now Pat. No. 8,358,725, which is a continuation of application No. 10/520,040, filed as application No. PCT/CA03/00909 on Jun. 25, 2003, now Pat. No. 7,564,934.

(30) Foreign Application Priority Data

Jun. 25, 2002 (CA) ...................................... 2389969

(51) Int. Cl.
*H04L 7/00* (2006.01)
*G06F 13/42* (2006.01)

(52) U.S. Cl.
USPC ............ 375/354; 375/371; 714/700; 713/400

(58) Field of Classification Search
USPC .......... 375/355, 362, 371, 372, 354; 370/516, 370/517, 518; 714/700; 713/400
See application file for complete search history.

(56) References Cited

U.S. PATENT DOCUMENTS 6,987,817 B1 * 1/2006 Reuveni ........................ 375/340
2004/0066871 A1 * 4/2004 Cranford et al. .............. 375/371

* cited by examiner

*Primary Examiner* — Ryan Johnson

(57) ABSTRACT

The real time processing supported by programmable control unit (RTP PCU) includes a method, a system and an apparatus for implementing programmable algorithms for analyzing a very wide range of low and high frequency wave-forms. The RTP PCU comprises sequential processing stages (SPS) for real time capturing and processing of in-coming wave-form and a programmable control unit (PCU) for controlling SPS operations and supporting adaptive signal analysis algorithms. The RTP PCU further comprises a circuit for Sequential Data Recovery from Multi Sampled Phase (SDR MSP).

19 Claims, 12 Drawing Sheets

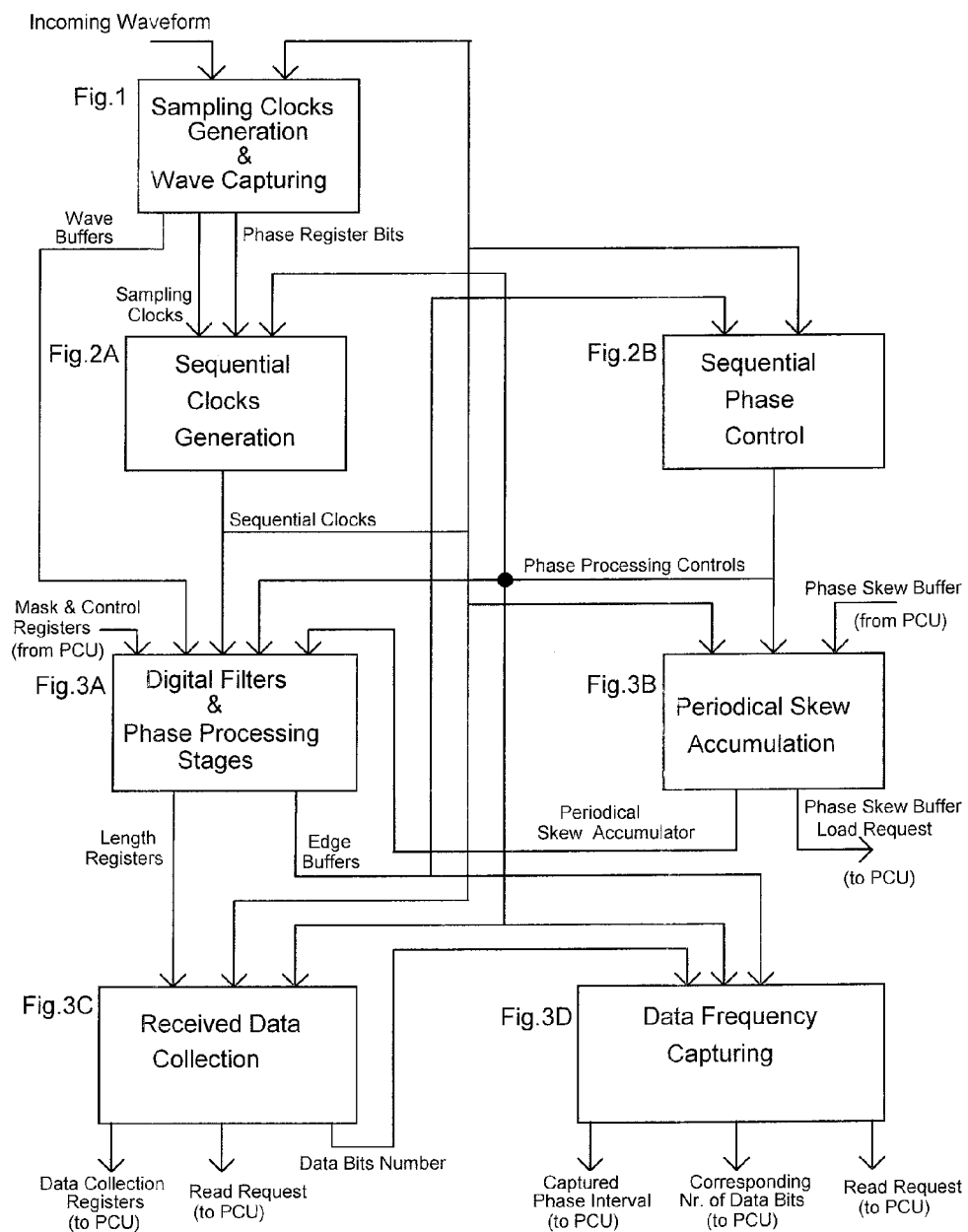

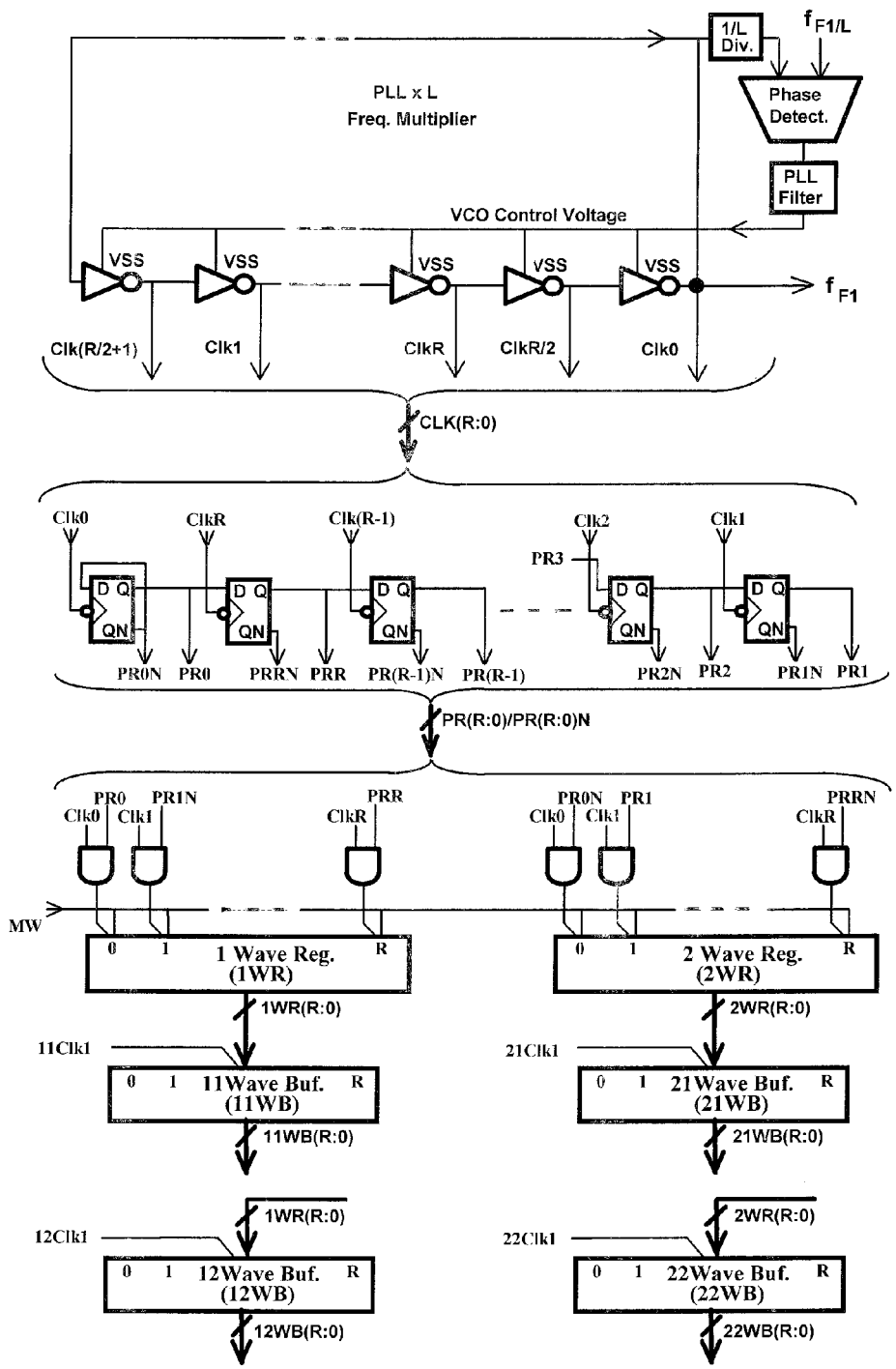

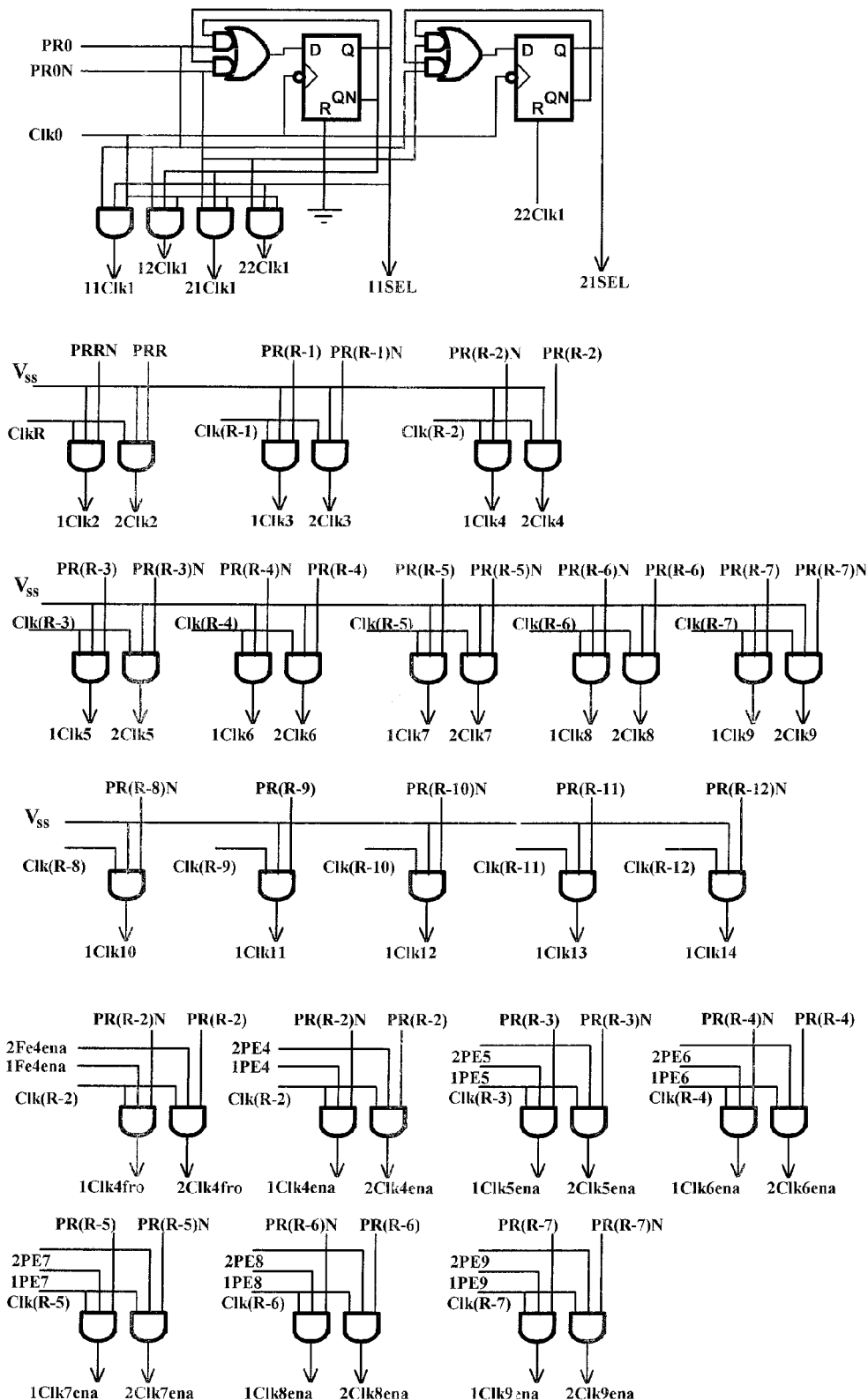
FIG.2A Sequential Clocks Generation (SCG)

FIG.2B Sequential Phase Control (SPC)
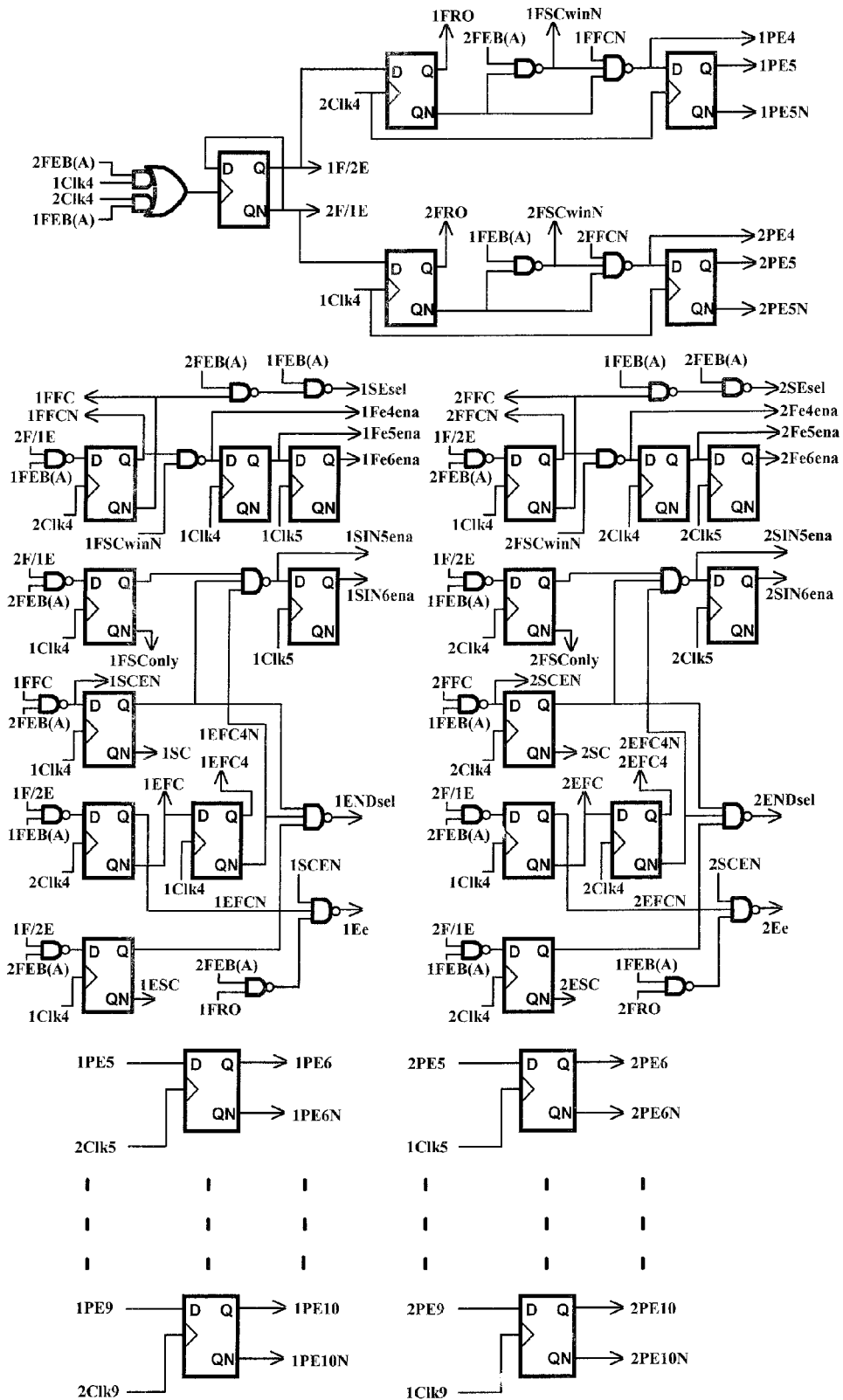

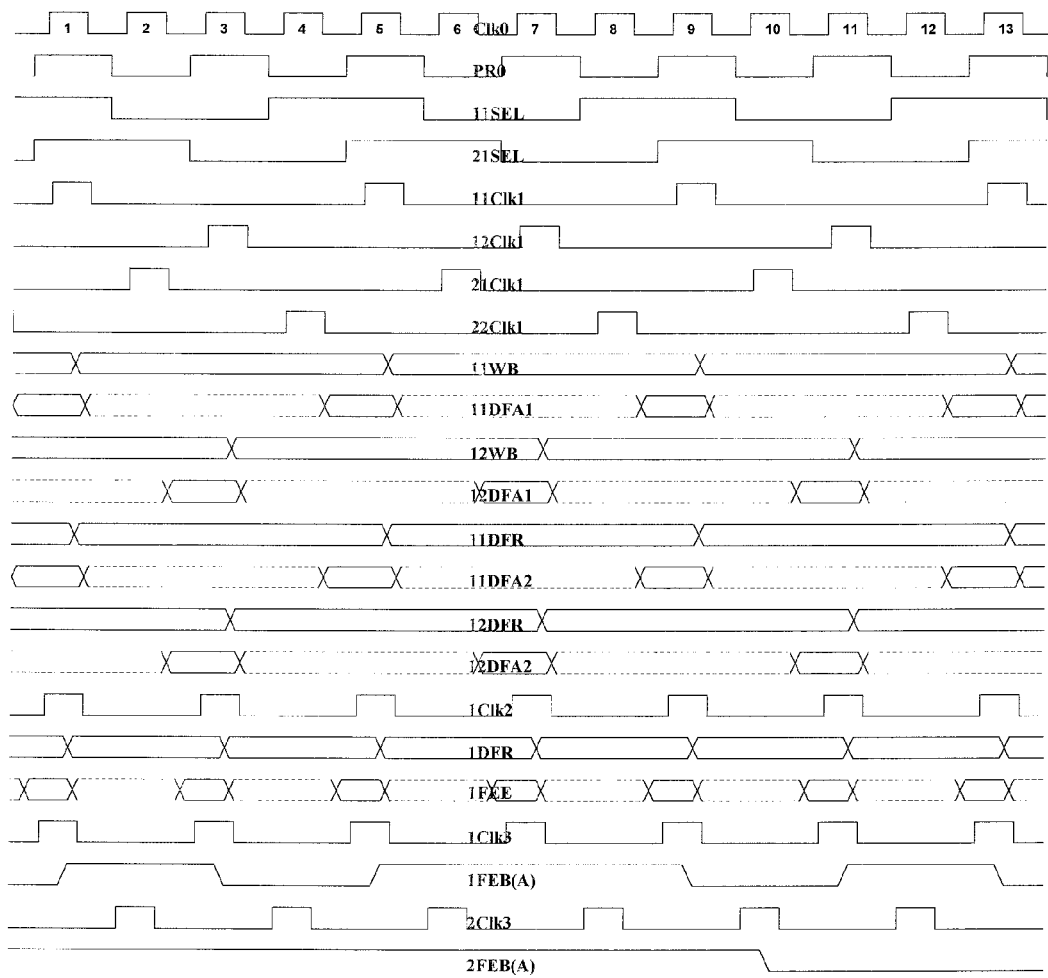
FIG.2C Timing Diagram of the SC and WC

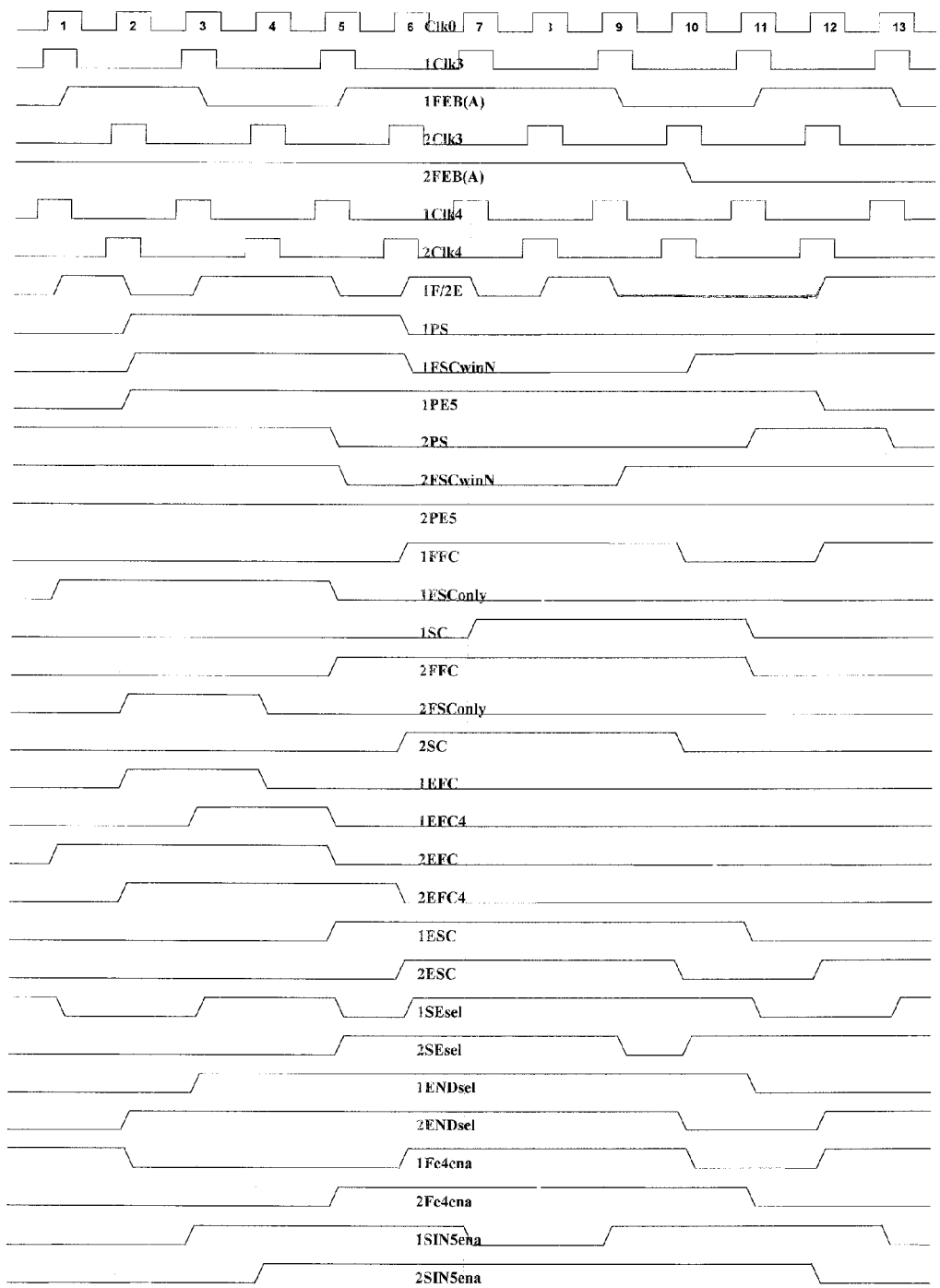
FIG.2D Timing Diagram of Sequential Phase Control proceeded by a phase2 long data string (continuation of FIG.2C)

FIG.3A Phase1 of the Phase Processing Stages
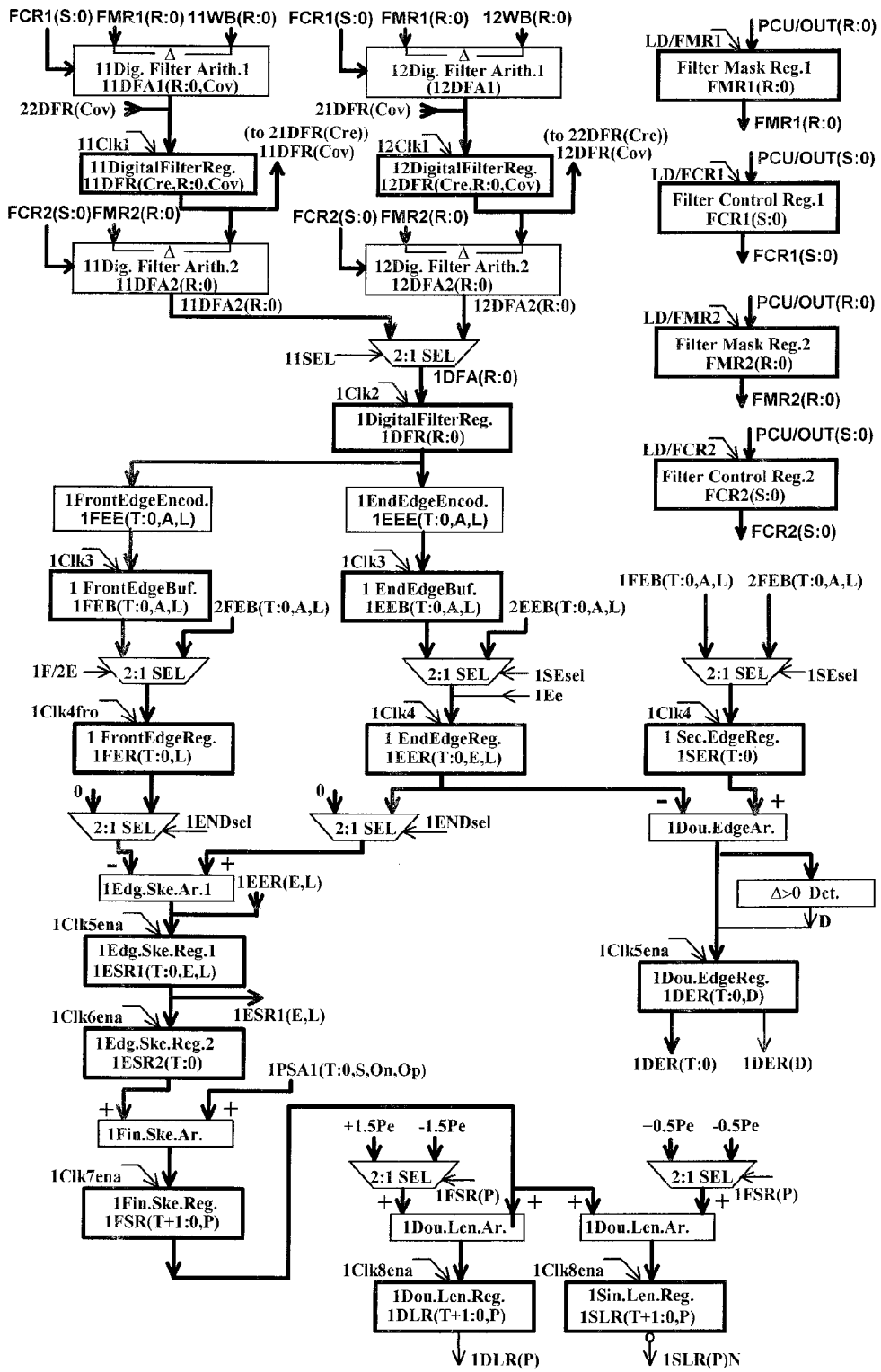

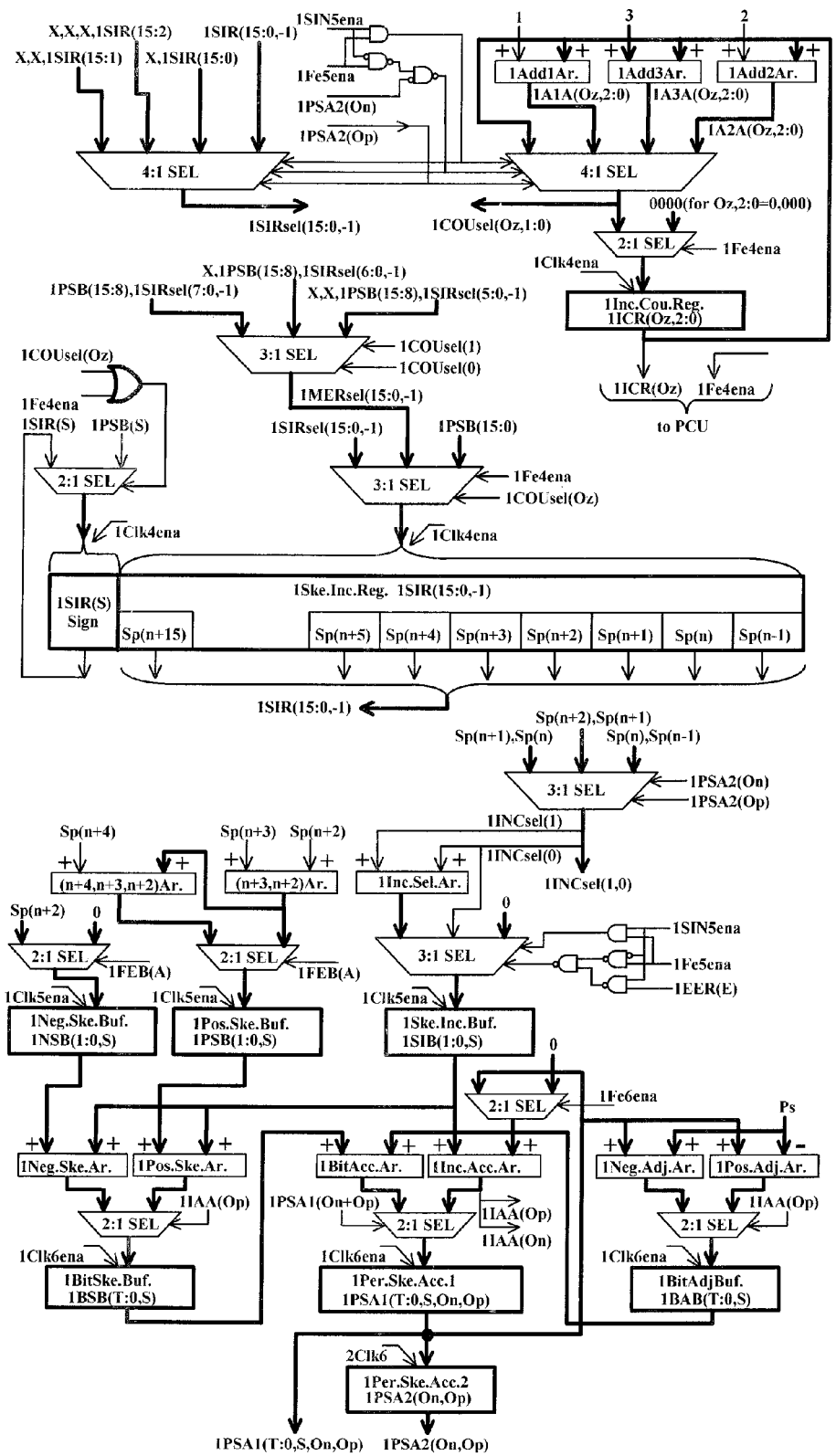
FIG.3B Periodical Skew Accumulation

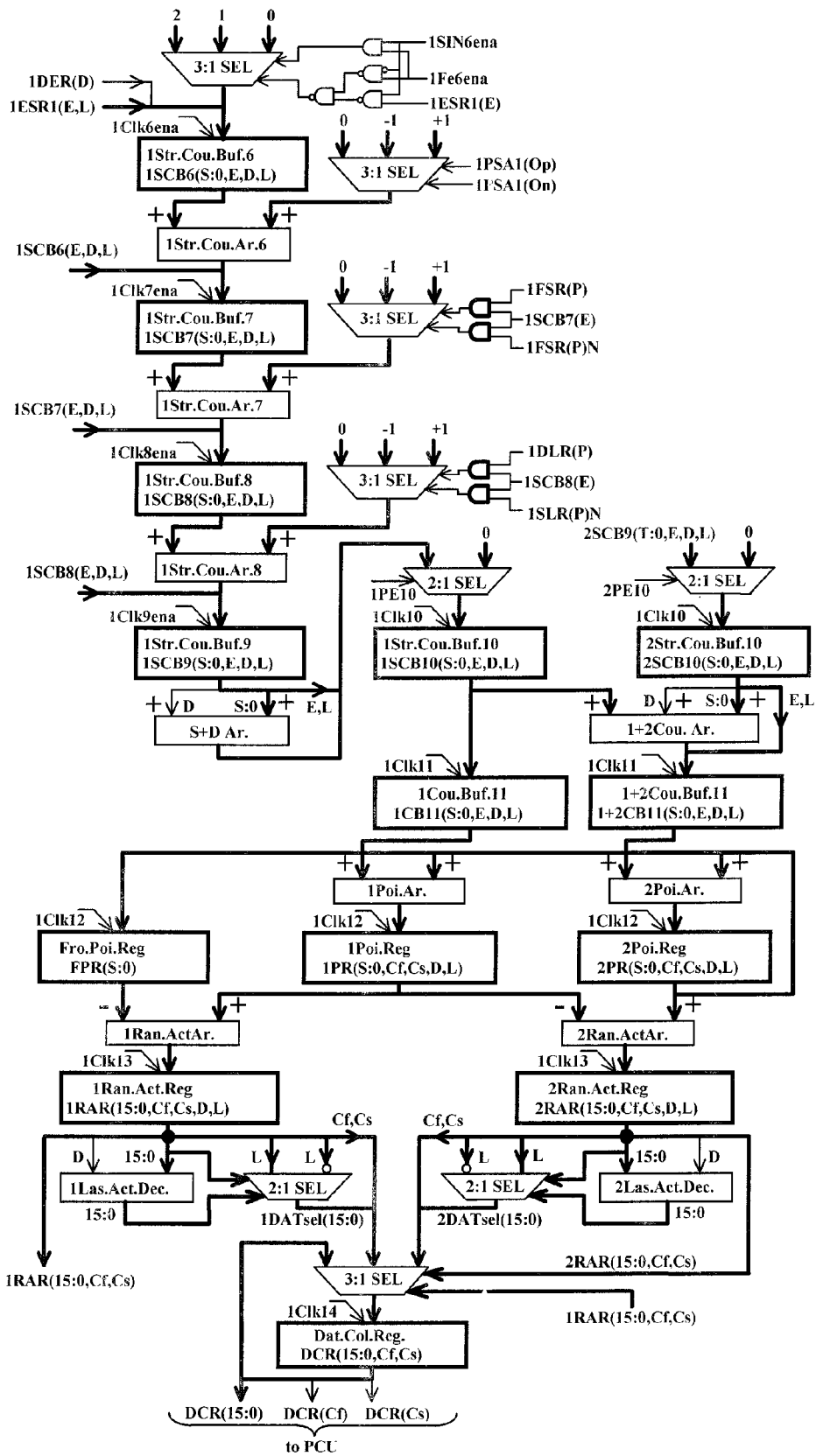
FIG.3C Received Data Collection
( DCR(Cf)/DCR(Cs) rising edge writes DCR(7:0)/DCR(15:8) accordingly into PCU Input Register )

FIG.3D Data Frequency Capturing
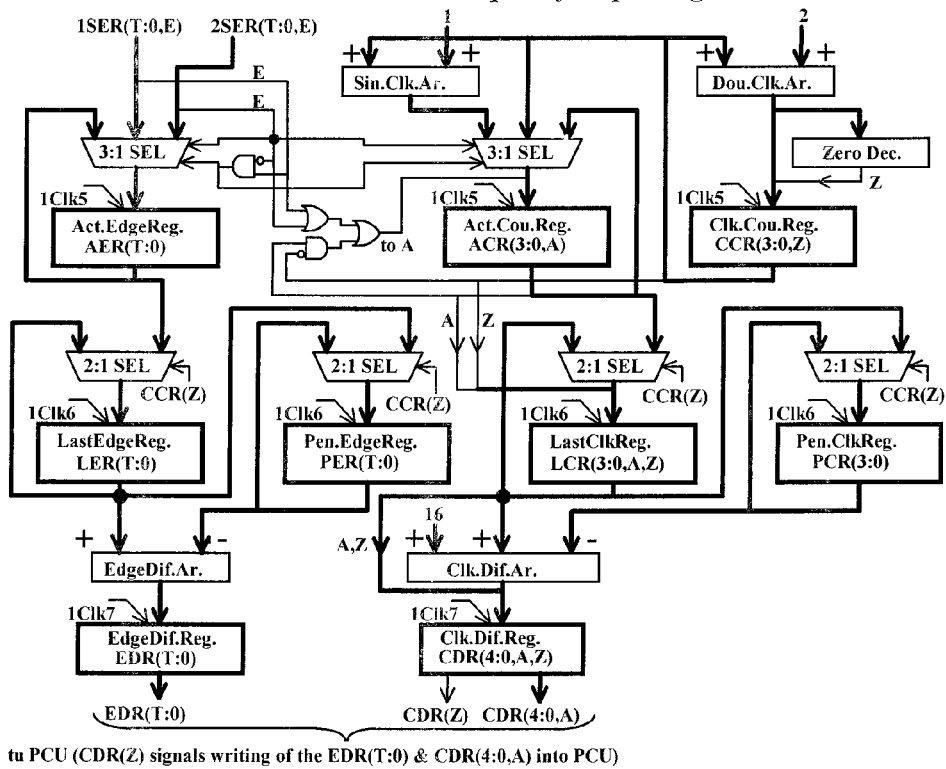
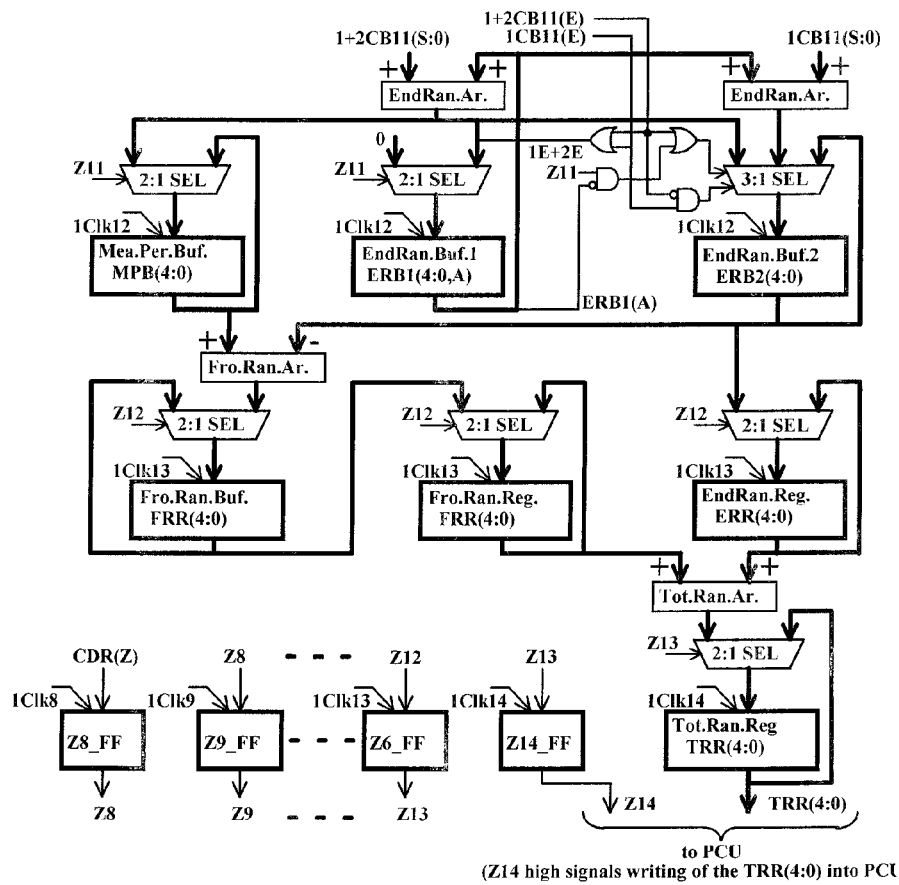

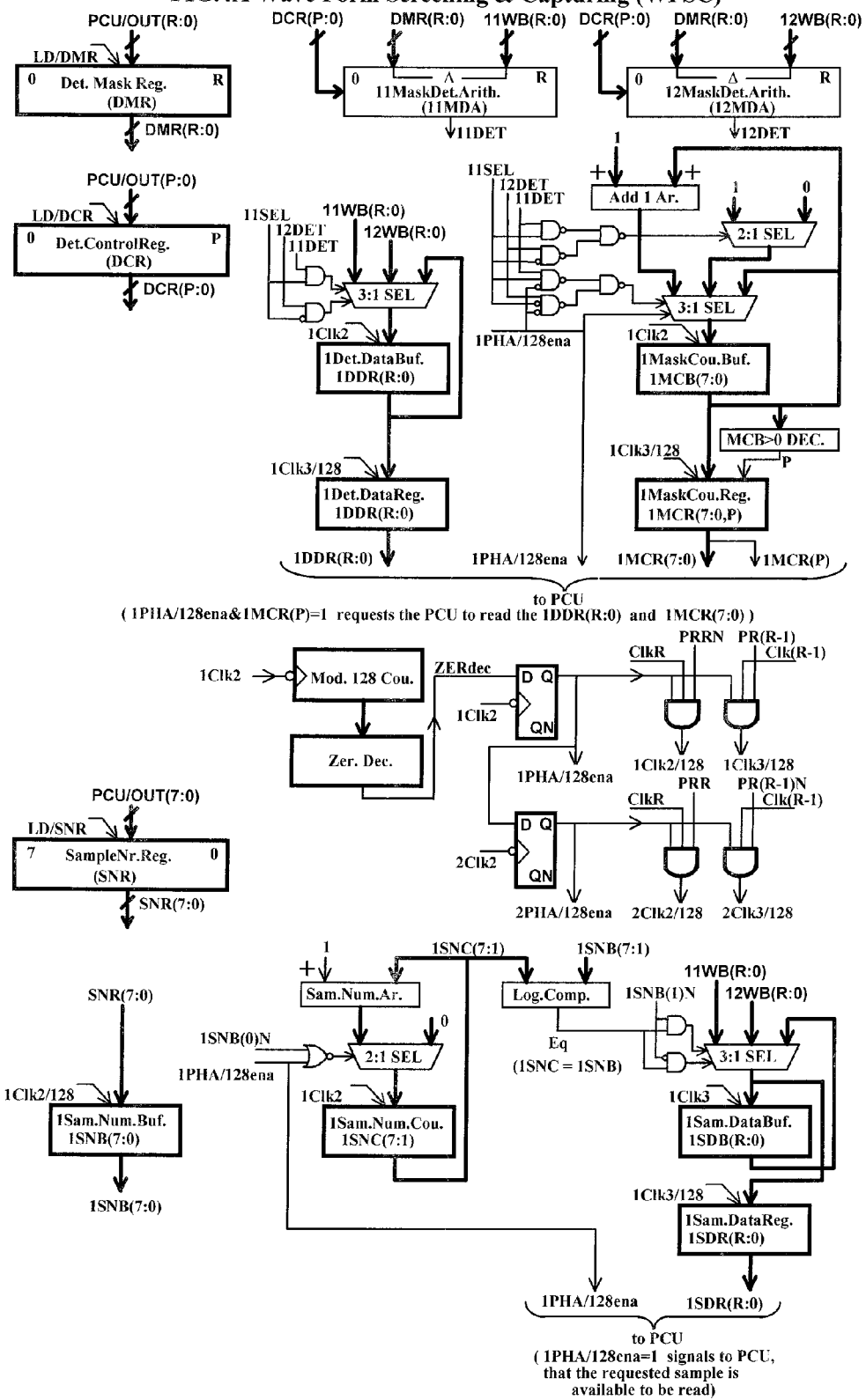

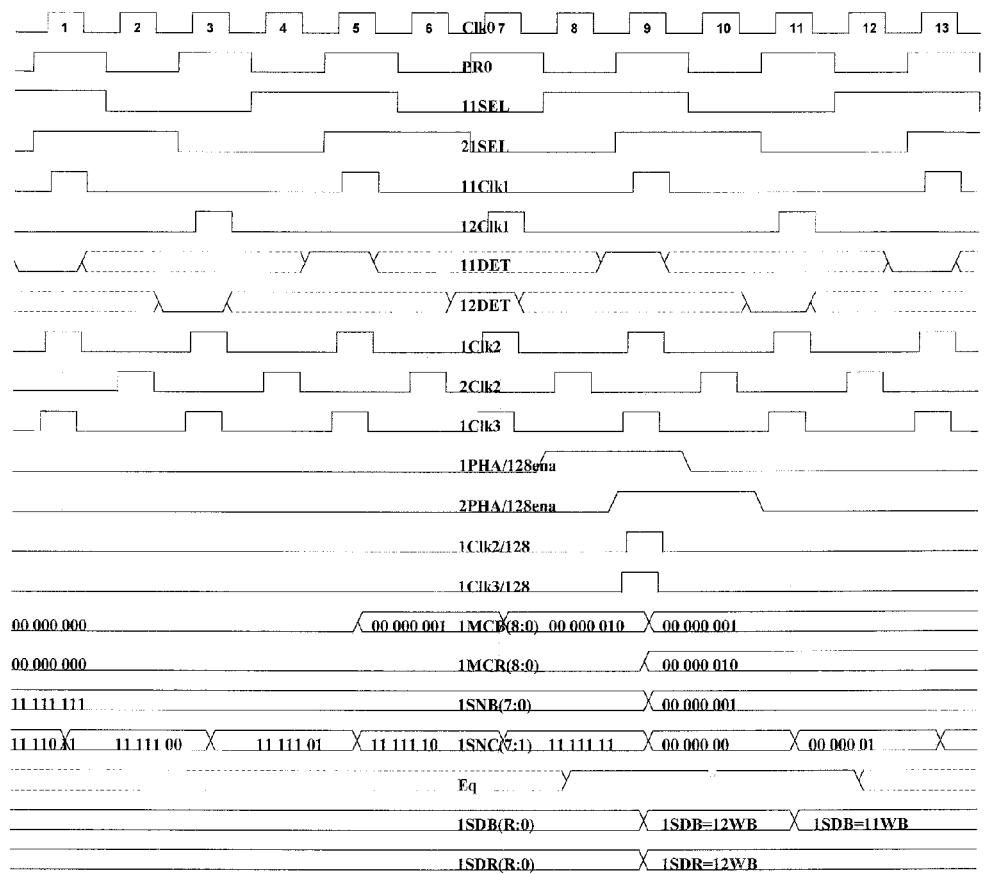
FIG.4B Timing Diagrams of the WFSC

REAL TIME PROCESSING SUPPORTED BY PROGRAMMABLE CONTROL UNIT

This patent application is a continuation of U.S. patent application Ser. No. 12/489,399 filed on Jun. 22, 2009 wherein the Ser. No. 12/489,399 is hereby incorporated by reference in its entirety, wherein the 12/489,399 is the continuation of U.S. patent application Ser. No. 10/520,040 filed on Dec. 27, 2004 and issued as U.S. Pat. No. 7,564,934 on Jul. 21, 2009, wherein the Ser. No. 10/520,040 filed under 35 U.S.C. 371 claims priority benefits from International Application No. PCT/CA03/000909 filed on Jun. 25, 2003, wherein the PCT/CA03/000909 application claims priority benefits from Canadian Patent Application No. 2,389,969 filed on Jun. 25, 2002.

BACKGROUND OF THE INVENTION

1. Field of the Invention

This invention is directed to an analysis of a waveform for a telecommunication system or for a measurement equipment, and more particularly to a Digital Signal Processing of Multi-Sampled Phase (DSP MSP).

The DSP MSP allows waveform analysis, noise filtering, and data recovery for wireless, optical, or wireline transmission systems and measurement systems and for a wide range of data rates and waveform timings.

The invention further includes Sequential Data Recovery from Multi Sampled Phase (SDR MSP), which is a version of the DSP MSP, which provides clock and data recovery for optical communications.

2. Background Art

Conventional waveform analyzers and serial data receivers use an analog front end for signal filtering, data recovery, and for a generation of data recovery sampling clock. Therefore more expensive bipolar or BICMOS technologies are needed to achieve sufficient performance, and such conventional designs have rather limited noise filtering capabilities and are able to cover only narrow application areas.

Analog design problems are further compounded by lower supply voltages which cause insufficient voltage head-room in deep sub-micron IC's which are becoming dominant in today's and future electronics.

There was a need for a waveform timing analyzer and a digital method of signal analysis which will reduce cost and complexity by replacing said analog or BICMOS technologies with less expensive CMOS technologies, and will improve noise filtering and increase programmability of data analysis algorithms and improve reliability of data recovery functions.

The other relevant background art is presented by the citations listed below:

D1. U.S. Pat. No. 5,668,830 by Georgiu Christos, 16 Sep. 1997,
D2. PCT/CA01/00723/WO 01 91297 by Bogdan John, 29 Nov. 2001,
D3. US 2002/0009171 by Ribo Jerome, 24 Jan. 2002,
D4. U.S. Pat. No. 5,592,125 by Williams Bertrand, 7 Jan. 1997,
D5. U.S. Pat. No. 6,987,817 by Reuveni David, 17 Jan. 2006,
D6. U.S. Pat. No. 4,977,582 by Zelle Bruce, 11 Dec. 1990,
D7. U.S. Pat. No. 5,467,464 by Oprescu Florin, 14 Nov. 1995,
D8. U.S. Pat. No. 5,872,791 by Propp David, 16 Feb. 1999,
D9. EP 0 292 208 by American Telephone & Telegraph, 23 Nov. 1988.

This invention is based on substantially different principles of operation, including:

measurements of pulse lengths of incoming wave-form with accuracy matching single gate delays and digital processing of such accurate pulse lengths, for recovering data or analyzing the waveform;

and adaptive signal processing utilizing verification of received waveforms.

Such superior principles of operation eliminate significant limitations of the background art and thus enable significantly longer transmission distances.

SUMMARY OF THE INVENTION

1. Purpose of the Invention

It is an object of present invention to create a circuit for Digital Signal Processing of Multi-Sampled Phase (DSP MSP) of a wave-form, and more particularly to provide a circuit for Sequential Data Recovery from Multi Sampled Phase (SDR MSP), of an optically received wave-form.

The DSP MSP shall allow programmable comprehensive noise filtering and wave-form timing analysis for wave-forms ranging from lowest to highest frequencies.

The SDR MSP shall replace expensive specialized analog circuits with inexpensive, programmable, and universal digital solution which will provide significantly better phase noise immunity and signal recovery reliability and can be implemented with less expensive IC technologies.

2. General Components of the Invention

The DSP MSP invention provides an implementation of programmable algorithms for analyzing a very wide range of low and high frequency wave-forms.

The DSP MSP comprises a synchronous sequential processor (SSP) for real time capturing and processing of incoming wave-form and a programmable computing unit (PCU) for controlling SSP operations and supporting adaptive signal analysis algorithms.

Said SSP invention comprises a multi_sampled phase (MSP) capturing of incoming wave-form level by a locally generated sampling clock and its sub-clocks generated by the outputs of serially connected gates which the sampling clock is propagated through. If an active edge of the wave-form is detected by capturing a change in a wave-form level, the position of the captured signal change represents an edge skew between the wave-form edge and an edge of the sampling clock. In addition to the above wave-form capturing method, the SSP includes 3 other methods of the edge skew capturing which are defined below:

the sampling clock captures the outputs of serially connected gates which the incoming wave-form is propagated through;

the outputs of serially connected gates which the incoming wave-form is propagated through, provide wave-form sub-clocks which capture the sampling clock.

the incoming wave-form captures the outputs of serially connected gates which the sampling clock is propagated through;

The above mentioned edge skew capturing methods further include:

using falling edges of said sub-clocks for driving clock selectors which select parallel processing phases during which positive sub-clocks are enabled to perform said edge skew capturing, or using rising edges of said sub-clocks for driving selectors which select parallel processing phases during which negative sub-clocks are enabled to perform said edge skew capturing;

using serially connected clock selectors for enabling consecutive sub-clocks, in order to assure that consecutive sub-clocks will target appropriate consecutive bits of appropriate capture registers.

The SSP invention includes using said serially connected gates:
- as being an open ended delay line;
- or being connected into a ring oscillator which can be controlled in a PLL configuration;
- or being connected into a delay line which can be controlled in a delay locked loop (DLL) configuration.

Every said edge skew amounts to a fraction of a sampling clock period.

The SSP invention comprises measuring time intervals between active wave form edges, as being composed of said edge skew of a front edge of the incoming waveform, an integer number of sampling clock periods between the front edge and an end edge, and said edge skew of the end edge of the wave-form.

The SSP invention further comprises a parallel multiphase processing of incoming signal by assigning consecutive parallel phases for the capturing of edge skews and/or processing of other incoming wave-form data with clocks which correspond to consecutive sampling clocks. Consequently the SSP invention comprises using 1 to N parallel phases which are assigned for processing incoming signal data with clocks corresponding to sampling clock periods number 1 to N, as it is further described below:
- circuits of phase1 process edge skews or phase skews or other incoming signal data with a clock which corresponds to the sampling clock period number 1;
- circuits of phase2 process edge skews or phase skews or other incoming signal data with a clock which corresponds to the sampling clock period number 2;
- finally circuits of phaseN process edge skews or phase skews or other incoming signal data with a clock which corresponds to the sampling clock period number N.

Said parallel multiphase processing allows N times longer capturing and/or processing times for said multiphase stages, compared with a single phase solution.

The SSP invention includes parallel stage processing of incoming signal by providing multiple processing stages which are driven by the same clock which is applied simultaneously to inputs of output registers of all the parallel stages.

The SSP further comprises a synchronous sequential processing of incoming signal by using multiple serially connected processing stages with every stage being fed by data from the previous stage which are clocked-in by a clock which is synchronous with the sampling clock. Since every consecutive stage is driven by a clock which is synchronous to the same sampling clock, all the stages are driven by clocks which are mutually synchronous but may have some constant phase displacements versus each other.

The SSP further comprises:
- merging of processing phases which occurs if multiple parallel processing phases are merged into a smaller number of parallel phases or into a single processing phase, when passing from a one processing stage to a next processing stage;
- splitting of processing phases which occurs if one processing phase is split into multiple processing phases or multiple processing stages are split into even more processing stages, when passing from a one processing stage to a next processing stage.

The SSP invention includes a sequential clock generation (SCG) circuit which uses said clock selectors and said sub-clocks: to generate SSP clocks which drive said parallel phases and said sequential stages, and to generate selector switching signals for said merging and splitting of processing phases.

The SSP invention includes time sharing of said parallel phases: which is based on assigning a task of processing of a newly began wave-form pulse to a next available parallel processing phase.

The SSP comprises a sequential phase control (SPC) circuit, which uses results of a wave edge decoding and said SSP clocks, for performing said time sharing phase assignments and for further control of operations of an already assigned phase.

The SSP comprises passing outputs of a one parallel phase to a next parallel phase, in order to use said passed outputs for processing conducted by a following stage of the next parallel phase. The outputs passing is performed: by re-timing output register bits of the one phase by clocking them into an output register of the next parallel phase simultaneously with processing results of the next parallel phase.

The SSP further comprises all the possible combinations of the above defined: parallel multiphase processing, parallel stage processing, synchronous sequential processing, merging of processing phases, splitting of processing phases, and outputs passing.

The SSP invention includes processing stage configurations using selectors, arithmometers, and output registers, which are arranged as it is defined below:
- input selectors select constant values or outputs of previous stages or outputs of parallel stages or an output of the same stage to provide arithmometer inputs, and arithmometer output is clocked-in to an output register by a clock which is synchronous to the sampling clock;
- multiple arithmometers are fed with constant values or outputs of previous stages or outputs of parallel stages or an output of the same stage, and an output selector selects an arithmometer output to be clocked-in to an output register by a clock synchronous to the sampling clock;
- the above defined configuration as being supplemented by using an output of an output selector of a parallel processing stage for controlling output selector functions.

Proper arrangements of said parallel and sequential combinations and said stages configurations provide real time processing capabilities for very wide ranges of signal frequencies and enable a wide coverage of very diversified application areas.

The DSP MSP invention comprises two different methods for accommodating a phase skew between the sampling clock and a clock which drives the incoming wave-form, and both methods allow elimination of ambiguities and errors in decoding incoming signal data patterns. Said two methods are further defined below:
- a clock synthesizer is used for producing the sampling clock, which will maintain frequency or phase alignment with the clock which drives the incoming waveform;
- expected phase skews between the sampling clock and the wave-form driving clock are calculated and used to correct measurements and data patterns decoding of the incoming signal pulses;
- both above mentioned methods include measurements of phase or frequency deviations of the incoming signal clock versus the sampling clock, and using said measurements results to control the clock synthesizer or to calculate the expected phase skews.

The DSP MSP invention comprises a fractional bit staffing (FBS) which improves accuracy of fixed point arithmetic far beyond of what conventional solutions could offer.

The FBS uses processing arguments which are expressed as a series of terms, where each term may have a differently staffed last bit or several last bits. Said differently staffed last bits express a fractional value which is combined with previous bits which express a constant more significant part of a processing argument.

The DSP MSP cumulative processing operations are split into a series of basic addition or subtraction or comparison operations. Every said consecutive term, of a processing argument of a cumulative operation, is used for processing performed during a corresponding consecutive basic operation.

Consequently using the FBS enables reducing of a total error of a long cumulative processing operation to a single last bit resolution.

The DSP MSP invention comprises: using phase differences between incoming signal pulses identified with the MSP captures and expected data patterns defined by sampling clock periods, for processing of the incoming signal and for detecting data patterns delivered by incoming signal pulses.

The DSP MSP invention further comprises more conventional method, which calculates whole time intervals of incoming signal pulses and divides them by time intervals of expected data patterns which would be defined in sampling clock periods.

It shall be noted however: that said use of the phase differences, which are small fractions of the whole intervals, allows significant reductions in processing time and in processing hardware.

The DSP MSP invention includes noise filters for digital filtering of a captured wave-form, which include the circuits listed below:
- filter mask registers and filter control registers which can be downloaded from the PCU;
- digital filter arithmometers which use the mask registers content for correcting captured wave-forms in accordance with control codes provided by said filter control registers.

Said noise filters further include adding a second noise filter stage in every noise filtering parallel phase for the purpose of extending a range of a filtered waveform beyond a boundary of a single phase.

Said second filter stages shall have the same basic circuits as the above mentioned first filter stages.

In order to allow said boundary extension, carry over bit or bits of an output register of said first filter stage of one phase shall be clocked-in into an output register of the first filter stage of a next phase together with filtering results of the next phase. Consequently the second filter stage of the next phase shall use the output register of the first stage for filtering a wave-form interval which extends through both said phases.

The DSP MSP invention includes phase processing stages (PPS), which can perform listed below operations:
- calculating the front edge skew and the end edge skew of the in-coming wave-form pulses;
- combining said edge skews with other indicators of pulse duration and phase deviations between the sampling clock and a clock which generates the incoming waveform;
- evaluating the resulting timing of the incoming wave-form pulses versus expected timing values which correspond to interpretation patterns of the incoming signal;
- communicating results of the above mentioned operations to other circuits of the DSP MSP.

The DSP MSP invention includes periodical skew accumulation (PSA) circuits, which can perform listed below operations:
- providing amounts of phase skew between the sampling clock period versus an expected period of a clock which drives the incoming signal;
- providing said phase skews as being different for every individual sampling clock period;
- reading the next set of said phase skews from external circuits, and seamless attaching them to a present set of the phase skews;
- calculating accumulations of said phase skews for every pulse or for combinations of pulses of the incoming signal;
- synchronous communicating of said accumulations of the pulse skews to the phase processing stages and/or to other parts of the DSP MSP.

The DSP MSP invention further includes received data collection (RDC) circuits for performing the operations, which are listed below:
- using outputs of the PPS and the PSA circuits for detecting and registering incoming data patterns;
- seamless combining of the registered data patterns into unified data blocks consisting of fixed number of bits or bytes;
- seamless communicating of the unified data blocks to an internal control unit and/or to an external unit.

The DSP MSP invention comprises data frequency capturing (DFC) circuits, for providing listed below operations:
- using outputs of MSP processing for detecting and registering time intervals of incoming signal pulses defined by the incoming signal clock;
- using outputs of RDC circuits for detecting and registering time intervals of the data patterns defined by the sampling clock, which correspond to the above mentioned already registered time intervals of incoming signal pulses;
- seamless combining of the pulses time intervals bounded with the corresponding data patterns intervals into frequency measurement blocks providing relation between a frequency of the incoming signal clock and a frequency of the sampling clock;
- seamless communicating of the frequency measurement blocks to an internal control unit and/or to an external unit.

The DSP MSP invention comprises wave-form screening and capturing circuits (WFSC), for providing listed below operations:
- using programmable data masks and programmable control codes for verifying incoming MSP captures for compliance or non-compliance with a pre-programmed screening patterns;
- buffering captured data for which the pre-programmed compliance or non-compliance have been detected;
- counting a number of the above mentioned detections;
- communicating both the buffered captured data and the number of detections, to an internal control unit and/or to an external unit;
- using programmable time slot selection circuits for selecting a time interval for which incoming MSP captures shall be buffered and communicated to an internal control unit and/or to an external unit.

Said PCU comprises implementation of the functions listed below:
- programming of verification functions and patterns for checking captured wave-forms for compliance or non-compliance with the patterns;

reading verification results and reading captured wave-forms which correspond to the preprogrammed verification criteria;

reading captured wave-forms which can be pre-selected by the PCU arbitrarily and/or based on other inputs from the SSP;

programming of noise filtering functions and noise filtering masks for filtering captured wave-forms;

reading results of real-time wave-form processing from the SSP, processing the results and providing control codes and parameters for further real-time wave-form processing in the SSP, in accordance with adaptive signal processing algorithms;

reading output data from the SSP, interpreting the data, and communicating the data to external units.

The DSP MSP invention comprises said SDR MSP circuits, which further include listed below features:

multisampling of every individual bit of a received data stream;

detection and registration of a phase of every rising or falling edge of the received data stream;

filtering out received signal noise;

using lengths of a pulse of the incoming signal for calculating a number of data bits received in the pulse;

registration of the detected data bits and seamless communication of the received data to an internal control unit and/or to an external unit.

BRIEF DESCRIPTION OF THE DRAWINGS

FIG. 1A shows Block Diagram of Sequential Data Recovery in order to introduce major sub-systems and interfaces shown in the next drawings numbered as FIG. 1-FIG. 4B.

Such next drawings are numbered correspondingly to processed data flow.

All interconnect signals between the next drawings have unique names identifying their sources and destinations explained in the Description of the Preferred Embodiments utilizing the same names.

Inputs supplied from different drawings are connected at the top or left side and outputs are generated on the bottom due to the top-down or left-right data flow observed generally.

Clocked circuits like registers or flip-flops are drawn with two times thicker lines than combinatorial circuits like arithmometers or selectors.

FIG. 1 shows Sampling Clocks and Wave Capturing circuits generating sub-clocks of a sampling clock and utilizing them to capture samples of incoming waveform.

FIG. 2A shows Sequential Clocks Generation (SCG) circuits providing sequential clocks suitable for synchronizing processing stages working in multistage and/or multiphase configurations.

FIG. 2B shows Sequential Phase Control (SPC) circuits utilizing such sequential clocks and signals from the processing stages for assigning different processing phases for processing consecutive inter-transition intervals and for controlling operations of such processing stages.

FIG. 2C shows Timing Diagram of the Sampling Clock and Waveform Capturing.

FIG. 2D shows Timing Diagram of the Sequential Phase Control being continuation of FIG. 2C proceeded by a phase2 long data string.

FIG. 3A shows Phase1 of the Phase Processing Stages controlled by Mask Registers and Control Registers programmed by PCU.

FIG. 3B shows Periodical Skew Accumulation circuits enabling elimination of phase skew errors, between the sampling clock and received data bits, accumulated over received data string.

FIG. 3C shows Received Data Collection circuits.

FIG. 3D shows Data Frequency Capturing circuits for measuring frequency difference between data bits and sampling clock.

FIG. 4A shows Wave Form Screening & Capturing (WFSC) circuit enabling screening and capturing incoming waveform within time intervals programmed by PCU.

FIG. 4B shows Timing Diagrams of the WFSC.

DESCRIPTION OF THE PREFERRED EMBODIMENT

1. Introduction to the Preferred Embodiment

The preferred embodiment implements the above defined general components of the DSP MSP in a configuration which provides said Sequential Data Recovery from Multi Sampled Phase (SDR MSP) of an optically received waveform.

2. Sampling Clocks and Wave Capturing

Accordingly the invention provides Sampling Clocks and Wave Capturing (SC&WC) circuits (see FIG. 1, FIG. 2A and FIG. 2C), for a high-resolution sampling and registration of a measured high frequency wave-form which are performed by the first stage of the SDR MSP.

Said high resolution is assured by using all the outputs of the inverters of the PLLxL ring oscillator, in order to sample the incoming measured time wave (MW) by capturing the MW signal in the first wave register (1WR) and in the second wave register (2WR).

Any falling edge of the Clk0 reverses the output of the flip-flop PR0, which represents the first bit of the phase register signal PR(R:0).

Since the falling edges of consecutive ring oscillator clocks Clk1 to ClkR propagate the output of the PR0 through the phase register bits PR1 to PRR, mutually reverse patterns 101 . . . 101 and 010 . . . 010 are being constantly shifted through the phase register bits 0 to R.

Therefore; the pattern 101 . . . 101 can be used to identify the time slots that allow selecting corresponding clocks Clk0 to ClkR during odd periods of the ring oscillator, and the pattern 010 . . . 010 can be used to identify the time slots that allow selecting corresponding clocks Clk0 to ClkR during even periods of the ring oscillator.

The above mentioned selection method enables the Clk(0:R) signals to produce glitch free clocks for capturing the MW signal in the 1WR/2WR for the odd/even cycle of the ring oscillator.

Said ability to use the two wave registers for sampling the MW during two consecutive $f_{F1}$ cycles, doubles a frequency of MW which can be processed by the SDR MSP.

The MW frequency range is enhanced even further; by reloading the 1WR to its first and second wave buffer (11WB and 12WB), and by reloading the 2WR to its first and second wave buffer (21WB and 22WB).

The 1WR is reloaded to its first/second wave buffer (11WB/12WB) by the signals 11Clk1/12Clk1, which are generated as it is explained below.

As it is shown in FIG. 2A and FIG. 2C; a falling edge of the Clk0 reverses the flip-flop 11SEL if the PR0=1, and a falling edge of the Clk0 reverses the flip-flop 21SEL if the PR0=0.

Consequently; the signal 11Clk1/12Clk1 is activated at (11SEL=1)&(PR0=1)/(11SEL=0)&(PR0=1), and the signal 21Clk1/22Clk1 is activated at (11SEL=0)&(PR0=0)/(11SEL=1)&(PR0=0).

3. Sequential Clocks Generation (SCG) and Digital Noise Filters (DNF)

The purpose of the SCG circuits is to provide all the SDR MSP internal clocks, which shall synchronize; uploading of incoming data samples into a parallel processing phases of the SDR MSP, and downloading the results of samples processing through consecutive stages of the SDR MSP.

The preferred embodiment covers the SDR MSP, which has two basic parallel processing phases; a processing phase one and a processing phase two.

Since the processing phase one and the processing phase two are built with identical components, only the phase one is usually shown in drawings defining the SDR MSP.

As it is shown in FIG. 2A and FIG. 2B, the processing phase one and the processing phase two are driven by similar sets of clocks which occur in alternative time periods for any particular stage of the SDR MSP.

Said uploading is started by the above mentioned signals 11Clk1/12Clk1 and 21Clk1/22Clk1. The uploading to the 4 wave buffers (11WB, 12WB, 21WB, and 22WB), results in two sub-phases being created for the phase one and the other two sub-phases being created for the phase two.

As it is shown in FIG. 3A/B/C, FIG. 2C/D and FIG. 4, FIG. 4A, said downloading is implemented; by the clocks 1Clk2, 1Clk3 and 1Clk4ena-1Clk9ena and their derivatives for the corresponding stages of the phase one, and by the clocks 2Clk2, 2Clk3 and 2Clk4ena-2Clk9ena and their derivatives for the corresponding stages of the phase two.

As it is shown in FIG. 2A, the 1Clk2, 1Clk3 and 1Clk4ena-1Clk9ena are driven by the ring oscillator output clocks ClkR-Clk(R-7), which provide decreasing phase delays between consecutive clocks which download the corresponding consecutive stages of the phase one. The suffix "ena" indicates that clocks are activated only, when their phase1/phase2 stages are actively processing sampling data which have been received during odd/even sampling periods (see also Sec. "Sequential Phase Control and Phase Processing Stages").

The decreasing phase delays of the oscillator output clocks ClkR-Clk(R-7) increase hold-on time margins for every stage, since every stage is downloaded from a previous stage which is downloaded by a delayed clock.

The SCG also generates; 1Clk4fro/2Clk4fro clocks which are activated only when a front edge is downloaded to the first processing stage of the phase1/phase2, and 1Clk4-1Clk14/2Clk4-2Clk9 clocks which remain active all the time. Some of the above mentioned clocks like the 1Clk10-1Clk14 are used to drive sequential processing stages which perform SDR MSP functions which are common for all the sampling data being processed by both processing phases (see also Sec. "Received Data Collection" and Sec. "Data Frequency Capturing"). Therefore the SCG does not generate corresponding to them 2Clk10-2Clk14 clocks.

The Digital Noise Filters (DNF) are implemented by the second and the third stages of the SDR MSP, as it is described below.

The second stage uses the digital filter arithmometers 11DFA1/12DFA1 for correcting the captured wave-forms by reducing noise which can be identified as a set of deviations from expected wave-form and/or data patterns.

The 11WB/12WB are connected to the digital filter arithmometers 11DFA1/12DFA1 (see FIG. 3A), which are fed to the digital filter registers 11DFR/12DFR.

The programmable control unit (PCU) determines logical and/or arithmetical processing which the 11DFA1/12DFA1 shall perform, by pre-loading the filter control register (FCR1) with a control code which is applied as the FCR1(P:0) to the 11DFA1/12DFA1.

Additionally the PCU determines the mask FMR1(R:0) which the captured data 11WB(R: 0)/12WB(R:0) shall be processed against, by pre-loading the filter mask register (FMR1).

In addition to the outputs of the digital filter arithmometers 11DFA1/12DFA1 of the phases 11/12: several carry over bits (22DFR(Cov)/21DFR(Cov)) from the registers of the previous parallel phases 22/21, are re-timed into the digital filter registers 11DFR/12DFR by the clocks 11Clk1/12Clk1.

Similarly carry over bits (11DFR(Cov)/12DFR(Cov)) from the registers of the phases 11/12, are re-timed into the digital filter registers 21DFR/22DFR.

Said carry over bits from the previous parallel phases allow the next third stage of the SDR MSP to filter incoming waveform pulses which extend beyond a boundary of a single capture register.

The 11DFR/12DFR are connected to the digital filter arithmometers 11DFA2/12DFA2 (see FIG. 3A), which are both fed to the digital filter register (1DFR) through the 2:1 selector (2:1SEL).

Similarly as for said second stage:

The programmable control unit (PCU) determines logical and/or arithmetical processing which the 11DFA2/12DFA2 shall perform, by pre-loading the filter control register (FCR2) with a control code which is applied to the 11DFA2/12DFA2.

Additionally the PCU determines the mask FMR2(R:0) which the pre-filtered data 11DFR/12DFR shall be processed against, by pre-loading the filter mask register (FMR2).

The 11SEL signal equal to 1/0 selects the 11DFA2(R:0)/12DFA2(R:0), to be downloaded to the phase one digital filter register (1DFR) by the clock 1Clk2 (see FIG. 3A and FIG. 2A).

4. Sequential Phase Control and Phase Processing Stages

The Sequential Phase Control is shown in the FIG. 2B and the Phase1 Processing Stages 2 to 8 (1PPS) are shown in the FIG. 3A.

The binary edge encoders (BEE) are implemented by the third stage of the SDR MSP, in order to convert filtered sampling data into binary encoded transition time of the filtered MW signal.

The phase1 front edge encoder (1FEE) detects a last transition of the MW during the sampling period, and produces a binary number of sampling clocks which occurred between the beginning of the sampling period and the last transition.

The phase1 end edge encoder (1EEE) detects a first transition of the MW during the sampling period, and produces a binary number of sampling clocks between the beginning of the sampling period and the first transition.

Whenever only one transition of the MW occurs during a sampling period (Ps), a difference of the 1FEE minus the 1EEE shall amount to 0.

If two transitions of the MW occur, the difference of the 1FEE minus the 1EEE shall amount to a positive nonzero number of sampling clocks which occurred between the transitions.

The binary number from the output of the 1FEE is loaded into the phase1 front edge buffer (1FEB) by the strobe signal 1Clk3. It shall be noticed that the active bit 1FEB(A) is set to 1/0, if there is/isn't any MW transition during the presently analyzed phase one cycle of the ring oscillator.

Similarly, the binary number from the output of the 1EEE is loaded into the phase1 end edge buffer (1EEB) by the strobe signal 1Clk3. It shall be noticed that the active bit 1EEB(A) is set to 1/0, if there is/isn't any MW transition during the presently analyzed phase one cycle of the ring oscillator.

Similarly to the above described phase 1 circuits, phase two cycle of the ring oscillator has corresponding to it edge encoders and their buffers: 2FEE, 2FEB, 2EEE and 2EEB.

Each of the above mentioned second phase buffers has similar active bit A set to 1/0, if there is/isn't any MW transition during the corresponding phase two cycle of the ring oscillator.

In the above described SDR MSP stages from 1 to 3, the phases 1 and 2 worked synchronously with the ring oscillator cycles which fed the phase1 with results of odd sampling cycles, and fed the phase2 with results of even sampling cycles.

In order to accommodate incoming sequences of 1s or 0s having unknown lengths, further stages of the SDR MSP phase1 are assigned to processing a whole interval of the MW having the same signal level and contained between two neighboring transitions, and corresponding stages of the SDR MSP phase2 are assigned to processing a whole next interval of the MW having the same signal level and contained between next two neighboring transitions. Said inter-transition intervals are also called data strings in further part of this document.

The above mentioned assignments of the phase 1 and the phase2 circuits for processing consecutive inter-transition intervals of the MW and control of the processing functions, are performed by sequential phase control (SPC) circuits which are described below and are shown in FIG. 2B (see also FIG. 2D and FIG. 3A/B/C/D).

The phase assignments are driven by the 1F/2E flip-flop as it is described below.

The 1F/2E flip-flop active high indicates that the phase1 front edge register (1FER) received or is going to receive a front edge location of the MW data string which shall be processed by the next phase1 circuits of the SDR MSP.

Since every phase1/phase2 cycle consists of two sampling clock periods, the 1F/2E flip-flop is reversed whenever the 2FEB(A)=1 condition passes through the 1Clk4 pulse or the 1FEB(A)=1 condition passes through the 2Clk4 pulse.

Therefore the 1F/2E flip-flop is deactivated when the end of the currently processed MW interval is signaled by the 2FEB(A)=1 condition or by the 1FEB(A)=1 condition.

The inverted output 2F/1E=1 of the above flip-flop, indicates that the phase2 front edge register (2FER) received or is going to receive a front edge location of the MW interval which shall be processed by the next phase2 circuits of the SDR MSP.

Therefore the 1F/2E=1/0 indicates that the phase1/phase2 circuits have been assigned for processing of a MW interval which is currently entering the stage4 of the phase1/phase2 accordingly.

The 1F/2E=1 allows activation of the phase1 selected flip-flop (1PS), by the rising edge of a first 2Clk4.

The 1PS flip-flop=1 activates the 1PE4 signal, which allows activation of the 1PE5 flip-flop by the rising edge of the next 2Clk4.

The 1PE4 signal can be also activated; by the 1FSCwinN signal which is driven low when a front edge occurs during a second sampling cycle of phase1 cycle, and by the 1FFCN signal which is driven low when a front edge occurs during a second sampling cycle of phase1.

Said 1FSCwinN=0 activates the 1PE4 before the first 1Clk4 instead of waiting for the first 2Clk4 which will encounter the 1F/2E=high condition.

The above explained 1PE4 by the 1FSCwinN activation, allows the 1PE4 to enable 1Clk4*ena* clock for capturing the 2EEB content in the 1EER (see also FIG. 2A and FIG. 3A), for the case of a single cycle string which has both front and end edges captured during a single cycle of the phase1 clock (see further description of the single cycle SC signal).

When end of string detection resets the 1F/2E flip-flop, the 1F/2E=0 allows deactivation of the 1PS/1PE5 by the rising edge of a first/second 2Clk4 accordingly.

The 1PE5 is propagated down through 1PE6 to 1PE10 flip flops by the consecutive clocks 2Clk4 to 2Clk9. The 1PE4 to 1PE9 flip flops are used to enable/disable stages 4 to 9 of the SDR MSP by enabling/disabling consecutive clocks 1Clk4*ena* to 1Clk9*ena* which drive the stages 4 to 9 (see also FIG. 2A).

A front edge of the string, which shall be processed by the phase1, can be signaled; by the 1FEB(A) activating the phase1 front first cycle (1FFC) flip-flop, or by the 2FEB(A) activating the 1FSCwinN signal.

When a front edge of the string is signaled by the 1FFC or by the 1FSCwinN, the signal 1Fe4*ena* is activated. The 1Fe4*ena* enables the clock 1Clk4*fro*, which stores the front edge position in the phase1 front edge register (1FER). The 1FER stores the front edge position until a string end is reached. When the end edge is captured in the 1EER, the 1FER is subtracted from the 1EER and the result is passed to the phase1 edge skew register2 (1ESR2).

When no edge is detected during all the intermediate sampling periods, it is assumed that all the edgeless intermediate samples propagate the front edge position until an end edge capture makes the subtraction possible.

The above propagation splits the MW interval into multiple subintervals having lengths of one or two sampling cycles, where the final subinterval is supplemented by adding the subtraction result.

The above mentioned SPC control functions allow a front edge to be stored in the phase1 front edge register (1FER) until an end edge is loaded to the phase1 end edge register (1EER):

consequently the stages 4 and 5 are used to calculate a phase skew between the front edge of the string, which has been "propagated" through said intermediate sampling periods, and the end edge of the string. The calculated phase skew is loaded to the 1ESR1/1ESR2 by the clocks 1Clk5*ena*/1Clock6*ena* accordingly.

The calculated phase skew plus all the edgeless sampling periods, which occurred between the front edge and end edge sampling periods, amount to a total length of a data string measured by the SDR MSP sampling clock.

The 1F/2E=1/0 selects the 1FEB/2FEB to be loaded into the phase1 front edge register (1FER) by the clock 1Clk4*fro*.

The phase1 second edge select 1SEsel=1/0 selects: the 2EEB/1EEB to be loaded into the phase1 end edge register (1EER), and the 2FEB/1FEB to be loaded into the phase1 second edge register (1SER).

The 1SEsel=1 is generated when a string ending edge occurred during the second of two sampling clock cycles, which supply data for a single period of the phase1.

The 1SEsel is set to 1:
if 1FEB(A)=0;
else if (2FEB(A)=1) & (1FFC=1), where 1FFC=1 signals that the front edge of an inter-transition interval occurred during the first of two sampling clock cycles which supply data for a single period of the phase1.

The phase1 single cycle 1SC=1 signals that the front edge of an inter-transition interval occurred during the first of the two sampling clock cycles and the end edge of an inter-transition interval occurred during the second of the two sampling clock cycles which correspond to a single period of the phase1.

The 1SC is set to 1/0 by the rising edge of the 1Clk4, if (2FEB(A)=1) & (1FFC=1)=1/0 accordingly.

The phase1 end select 1ENDsel=1/0 selects the 1FER/0 and 1EER/0 to be provided as the arguments of the phase1 edge skew arithmometer1 (1Edg.Ske.Ar.1).

The 1ENDsel=1 is generated when:
the end edge of the inter-transition interval has occurred during any of the two sampling cycles which constitute a single phase1 cycle.

The 1ENDsel is set to 1:
if the 1SC is set to 1;
else if the 1EFC4/EFC4N=1/0, where the 1EFC4N=0 signals that the end edge of an inter-transition interval has occurred during the first of the two phase1 related sampling cycles;
else if the ESC=1, where the 1ESC=1 signals that the end edge of an inter-transition interval has occurred during the second of the two phase1 related sampling cycles;

The phase1 single cycle interval 1SIN4ena=1/0 indicates a number of sampling cycles which are contributed to a total string lengths, by a string front subinterval or by a string end subinterval as captured by the two phase1 related sampling cycles.

The 1SIN4ena/1SIN5ena has timing, which propagates the single cycle information to the stage4/stage5 and allows it to select data for being captured by the 1Clk4ena/1Clk5ena accordingly.

The 1SIN5ena controls a number of incremental phase skew bits which are added to the periodical skew accumulator (see Sec. "Periodical Skew Accumulation").

The 1SIN5ena is further delayed by the 1Clk5 in order to produce the 1SIN6ena, which similarly controls the number of data bits which are collected from the string front and end subintervals (see Sec. "Received Data Collection").

The 1SIN4ena=1 is activated when:
a string front or end sub-interval, which is captured by the two phase1 related sampling cycles, is not bigger than single sampling cycle.

The 1SIN is set to 1:
if the 1FSConly=1, where the 1FSConly=1 signals that the front edge of an inter-transition interval has occurred during the second of the two phase1 related sampling cycles;
else if the 1SC=1;
else if the 1EFC4=1.

The front edge indicator 1Fe4ena active 1 determines if a front edge of a data string is loaded into the 1FER by enabling the 1CLK4fro clock (see also FIG. 2A)

The 1Fe4ena is activated when:
a front edge is signaled by the 1FFC=1 during the first sampling cycle, or by the 1FSCwinN=0 during the second sampling cycle.

The 1Fe4ena derivatives 1Fe5ena/1Fe6ena are re-timed by the 1Clk4/1Clk5 in order to propagate the front edge indication and make them usable for the 1Clk5ena/1Clk6ena clocks accordingly (see also FIG. 3B, FIG. 3C).

The end edge indicator 1Ee active 1 shows if an end edge of a data string is loaded into the 1EER.

The 1Ee is activated when an end edge is signaled:
by the 1EFC=1 during the first sampling cycle;
or by the (2FEB(A)=1) & (1PS=1)=1 during the second sampling cycle;
or by the 1SCEN for a single cycle string which is contained in a single phase1 cycle.

The 1Ee indicator is downloaded into the 1EER and further through the next stages of the SDR MSP as E bit, in order to control the Periodical Skew Accumulation and the Received Data Collection (see FIG. 3A/FIG. 3B/FIG. 3C).

For every sampling clock cycle, which occurs during MW inter-transition cycles of the phase1, two explained below basic functions are performed:
a data bit is added to a data string which corresponds to the MW inter-transition interval (see Sec. "Received Data Collection");
a phase skew, which is expected between a sampling clock period and a period of a received data bit, is added to the phase1 skew accumulator1 (1PSA1) as it is further explained in the Sec. "Periodical Skew Accumulation".

While the above mentioned functions are being performed by the Received Data Collection and by the Periodical Skew Accumulation, outputs of the Phase Processing Stages (see FIG. 3A) are ignored until the end of the string.

In order to explain operations of the Phase Processing Stages at the end of a data string, listed below estimates shall be made:
the content of the above mentioned 1ESR2 never exceeds +/−Ps (where Ps is a sampling clock period), because the 1FER and 1EER can never exceed 1Ps value and the 1ESR2 is loaded with their subtraction result;
the content of the 1PSA1 never exceeds +/−1.2Ps, because eventual positive/negative 1PSA1 overflows are corrected by subtracting/adding an expected data bit period and increasing/decreasing number of data bits which are being collected.

When the end of the string is reached, the Phase Processing Stages perform functions which are explained below.

The 1FER is subtracted form the 1EER and the resulting phase skew between the front and end edges is transferred into the phase1 edge skew register2 (1ESR2).

The 1PSA1 and the 1ESR2 are added and the result, which is not greater than 2.2Ps, is loaded into the phase1 final skew register (1FSR).

The 1FSR content is evaluated for how many received data bits it corresponds to and used to modify lengths of the data string, as it is further explained below.

If 1FSR(P)=1 indicates positive 1FSR content: 1FSR−1.5Pe is loaded into the phase1 double length register (1DLR), and 1FSR−0.5Pe is loaded into the phase1 single length register (1SLR) (where the Pe is an averaged expected data bit period which is calculated and provided by the PCU).

A positive 1DLR content indicated by the 1DLR(P)=1, shows that the 1FSR content shall be approximated to +2 data bits which need to be added to the data string by the Data Collection circuits.

A negative 1DLR content indicated by the 1DLR(P)=0 and a positive 1SLR content indicated by the 1SLR(P)=1, show that the 1FSR content shall be approximated to +1 data bits which need to be added to the data string by the Data Collection circuits.

When the 1SLR is negative, the 1SLR(P)=0 indicates that the 1FSR content shall be approximated to 0 data bits and nothing is added to the data string by the Data Collection circuits.

If 1FSR(P)=0 indicates negative 1FSR content: 1FSR+1.5Pe is loaded into the phase1 double length register (1DLR), and 1FSR+0.5Pe is loaded into the phase1 single length register (1SLR).

A negative 1DLR content indicated by the 1DLR(P)=0, shows that the 1FSR content shall be approximated to −2 data bits and 2 bits need to be subtracted from
the data string by the Data Collection circuits.

A positive 1DLR content indicated by the 1DLR(P)=1 and a negative 1SLR content indicated by the 1SLR(P)=0, show that the 1FSR content shall be approximated to −1 data bits and 1 bit need to be subtracted from the data string by the Data Collection circuits.

When the 1SLR is positive, the 1SLR(P)=1 indicates that the 1FSR content shall be approximated to 0 data bits and nothing is subtracted from the data string by the Data Collection circuits.

When incoming data periods are smaller than sampling clock periods, the above explained second edge captured in the 1FEB may differ from the above explained first edge captured in the 1EEB. Resulting interval between the two different edges corresponds to an additional data bit, which has data level opposite to a preceding data string. Said additional data bit is detected by subtracting the 1EER from the 1SER in the phase double edge arithmometer (1Dou.Edg.Ar.), which is followed by the Δ>0 Det. producing D=1 signal if a non-zero result occurs. The D indicator is downloaded to the phase1 double edge register (1DER) and further down to the stages of the Received Data Collection as the 1DER(D) bit.

5. Periodical Skew Accumulation (PSA)

While sampling clock period Ps can be kept close to expected period of received data bits Pe and a number of received data bits can be close to a number of sampling clock periods, they may be not the same.

Consequently periodical phase skews (Ps-Pe) between data capturing sampling clocks and received data bits can accumulate, and resulting periodical skew accumulation may become significant enough to require modifications of the registered number of sampling clocks, in order to receive an accurate number of data bits for a long data string.

In addition to the periodical phase skews there are also digitizing errors caused by digital processing of lengths of captured data strings, which can accumulate as well and contribute significant errors for longer strings.

The cumulative error from periodical phase skews is corrected, as it is explained below:
  an expected value of a periodical phase skew (Ps-Pe) is added to the phase1 periodical skew accumulator1 (1PSA1), for every sampling clock period which occurs during the whole data string;
  positive/negative overflow of the 1PSA1 is corrected by subtracting/adding Pe from/to the 1PSA1, while the Received Data Collection adds/subtracts the corresponding data bit to/from the current data string.

Said accumulation of digitizing errors is eliminated by facilitating use of different skew increments values for representing the periodical phase skew (Ps-Pe) for consecutive sampling clocks. Said use of the different skew increments allows any fractional value of the periodical phase skew to be expressed by a series of digital numbers having properly staffed last bit.

In order to simplify further description of the preferred embodiment it is assumed that there are 15 delay elements in the ring oscillator which generates the sampling sub-clocks and therefore there are 15 sampling sub-clocks during any sampling cycle.

Taking into account frequency accuracy of inexpensive commonly available crystal oscillators, a single value bit plus a sign bit shall be fully sufficient for defining all the possible required periodical skew increments.

The implementation of the above mentioned PSA functions is shown in FIG. 3B and PSA operations are further explained below.

The incremental phase skews are loaded into the phase1 skew increments register (1SIR) from the PCU at the beginning of every data string.

The 1SIR contains a series of 16 skew increments Sp(n+15) to Sp(n) which are used for 16 consecutive sampling clocks referring to the same string, where every skew increment is a single bit component. Since the skew increments can be positive or negative, the 1SIR has also the sign bit SIR(S) which is common for all the skew increments and is loaded from the PCU as well. A string sub-interval which is processed during a single phase1 cycle is usually captured by 2 sampling clocks, and a sub-interval which is captured by single sampling clock can occur only at the beginning or at the end of a data string.

Therefore usually the end cells Sp(n+1),Sp(n) with the SIR(S) are added by the phase1 increments selected arithmometer (1Inc.Sel.Ar.) and loaded into the phase1 skew increments buffer (1SIB) which is added to the 1PSA1, and for the single clock sub-intervals the end cell Sp(n) is loaded into the 1SIB which is added to the 1SIR.

After utilizing a number of the end cells for the current sub-interval, the 1SIR is shifted right by the number of previously used cells, in order to make next cells available to be taken from the end of the 1SIR for the next sub-interval.

Following the series of the 16 increments: the 1SIR has the Sp(n−1) bit which is used for temporary storing of the Sp(n) increment bit after a negative overflow correction, when the 1SIB is downloaded from the 1SIR which temporarily remains shifted too far by one bit. The above mentioned operation of correcting 1PSA1 positive/negative overflow is performed when 1PSA1 positive/negative overflow bit 1PSA1(Op)=1/1PSA1(On)=1 accordingly. Said 1PSA1(On, Op) overflow bits are re-timed with the 2Clk6 clock into 1PSA2(On,Op) bits, in order to make them available for a next cycle of the 1Clk4*ena* and 1Clk5*ena* time slots. Said correction of a positive/negative overflow by subtracting/adding a Pe value, is implemented by subtracting/adding Ps−(Ps−Pe)=Ps−Sp, where Sp is a skew increment value of a particular received data bit.

At the beginning of a string the 1Fe6*ena* selects 0, as initial 1PSA1 content, to be accumulated with a skew increment in the 1PSA1.

Skew increments, which are added to 1PSA1 content, are selected by the two 3:1 SEL selectors, which are described below.

The first 3:1 SEL has INCsel(1,0) outputs which provide selections, which are explained below.
  If 1PSA2(On)=1 indicates negative corrections in the 1PSA, the 1SIB and the 1SIR, a content of Sp(n),Sp(n−1) is selected: in order to achieve correct 1SIB content, when a correction of 1SIR over-shifting will not be ready until the next phase1 cycle.
  If 1PSA2(Op)=1 indicates positive corrections in the 1PSA, the 1SIB and the 1SIR, a content of Sp(n+1),Sp(n+2) is selected: in order to achieve correct 1SIB content, when a correction of 1SIR under-shifting will not be ready until the next phase1 cycle.
  If (1PSA2(On)=0) & (1PSA2(Op)=0), a straight Sp(n+1), Sp(n) is selected.

The second 3:1 SEL allows selections, which are explained below.
  If 1SIN5*ena*&1Fe5*ena*=1 indicate a string front sub-interval which is contained in a single sampling cycle, 0 is selected;

If (1SIN5*ena*=0)&(1Fe5*ena*=1) indicate a string front subinterval which is not contained in a single sampling cycle, or the 1SIN5*ena*&1EER(E)=1 indicate a single cycle subinterval at the end of string or a single cycle string: the INCsel(0), which usually contains the Sp(n), is selected. In all the other cases: the output of the 1Inc.Sel.Ar., which provides INCsel(1)+INCsel(0), is selected.

In order to perform any accumulation, which may include overflow correction, within a single 1Clk6*ena* cycle:
- for regular phase skew accumulations without overflow corrections, the 1SIB content is added with the 1PSA1 content by the phase1 increments accumulator arithmometer (1Inc.Acc.Ar.), in order to be loaded into the 1PSA1;
- skew increment for a positive/negative correction is always loaded into the phase1 positive skew buffer (1PSB)/phase1 negative skew buffer (1NSB), simultaneously with the above explained regular skew increments being loaded into the 1SIB;
- the 1PSB/1NSB content is added to the 1SIB content by the phase1 positive skew arithmometer (1Pos.Ske.Ar.)/the phase1 negative skew arithmometer (1Neg.Ske.Ar.);
- resulting output of the 1Pos.Ske.Ar./1Neg.Ske.Ar. is loaded to the phase1 skew buffer (1BSB), if the advanced positive overflow indicator 1AA(Op)=1/0 accordingly on the output of the 1Inc.Acc.Ar.;
- the sampling period Ps is always subtracted/added from/to 1PSA1 content by the phase1 positive adjustment arithmometer (1Pos.Adj.Ar.)/phase1 negative adjustment arithmometer (1Neg.Adj..Ar.), for a future possible positive/negative overflow correction;
- resulting output of the 1Pos.Adj.Ar./1Neg.Adj.Ar. is loaded to the phase1 bit adjustment buffer (1BAB), if the advanced positive overflow indicator 1AA(Op)=1/0 accordingly on the output of the 1Inc.Acc.Ar.;
- in the next 1Clk6*ena* cycle after the positive or negative overflow detection, the 1PSA1(On+Op)=1 outputs combination selects the corrected 1BSB content added with the corrected 1BAB content for being accumulated in the 1PSA1 (instead of the regular 1SIB with 1PSA1 accumulation).

The 1SIR(15:0,S) is initially, at the beginning of a string, loaded with a content of the phase1 phase skew buffer 1PSB (15:0,S) which is selected by the 1Fe4*ena* to be applied to the input of the 1SIR(15:0,S).

Since next periodical phase increments shall always be available at the end of the 1SIR, every phase increments accumulation shall be accompanied by a right shifting of the 1SIR by the number of phase increments which were taken for the previous accumulation. Following the initial 1PSB (15:0,S) to 1SIR(15:0,S) downloading, said 1SIR right shifting is controlled by the signals 1SIN5*ena*&1Fe5*ena*, 1SIN5*ena*N&1Fe5*ena*, 1PSA2(On) and 1PSA2(Op) which select appropriately shifted content of the 1SIR(15:0,–1); as it is further defined below:
- straight 1SIR(15:0,–1) is selected for the 4:1 SEL output 1SIRsel(15:0,–1), if a single cycle front sub-interval is signaled by the 1SIN5*ena*&1Fe5*ena*=1;
- the 1SIR(15:0,–1) shifted by 1 is selected for the 1SIRsel (15:0,–1), if a non-single cycle front sub-interval is signaled by the 1SIN5*ena*N&1Fe5*ena*=1 or a negative overflow correction is signaled by the 1PSA2(On);
- the 1SIR(15:0,–1) shifted by 3 is selected for the 1SIRsel (15:0,–1), if a positive overflow correction is signaled by the 1PSA2(Op);
- the 1SIR(15:0,–1) shifted by 2 is selected, in all the other cases;
- the 1SIRsel(15:0,–1) is loaded into the 1SIR(15:0,–1), if there is no any downloading of next phase increments from the PCU.

The downloading of next phase increments from PCU is controlled by the phase1 increments counter register (1ICR), as it is further defined below:
- the 1ICR(Oz,2:0) is a modulo 8 counter with a zero overflow bit (Oz), which is set to 1 when a counted number crosses through 111/000 boundary;
- the 1ICR is initialized to 000 by the signal 1Fe4*ena*, at every beginning of a string;
- at every beginning of a string the 1Fe4*ena* is send to the PCU to signal that 1PSB(15:0,S) has been taken and the PCU shall make next 1PSB(15:8,S) ready to be loaded to the 1SIR;
- following the initialization in every next phase1 cycle, 0 is added to a previous 1ICR content if a single cycle front sub-interval is signaled by the 1SIN5*ene*&1Fe5*ena*=1, 1 is added to a previous 1ICR content if a non-single cycle front sub-interval is signaled by the 1SIN5*ene*N&1Fe5*ena*=1 or a negative overflow correction is signaled by the 1PSA2(On), 3 is added to the ICR if a positive overflow correction is signaled by the 1PSA2(Op), and 2 is added in all the other cases;
- output of the 3:1 SEL 1COUsel(1)=1 selects 1PSB(15:8) shifted by 2 and merged with 1SIRsel(5:0,–1) to provide the output of the phase1 merging selector 1MERsel(15:0,–1);
- output of the 3:1 SEL 1COUsel(0)=1 selects 1PSB(15:8) shifted by 1 and merged with 1SIRsel(6:0,–1) to provide the output 1MERsel(15:0,–1);
- outputs of the 3:1 SEL (1COUsel(1)=0)&(1COUsel(0)=0) select straight 1PSB(15:8) merged with 1SIRsel(7:0,–1) for the output 1MERsel(15:0,–1);
- output of the 3:1 SEL 1COUsel(Oz)=1 selects the 1MERsel(15:0,–1) outputs to be downloaded to the 1SIR(15:0,–1);
- the 1COUsel(Oz) is loaded into the 1ICR(Oz) bit, which is send to the PCU to signal that the previous 1PSB(15:8,S) has been taken and next increments shall be presented on the 1PSB(15:8,S) bits.

6. Received Data Collection (RDC)

The RDC circuits are shown in FIG. 3C and its principles of operations are defined below.

The RDC consists of: phase1 string counters, phase2 string counters, and phases 1&2 data merging circuits. Said three basic parts are further explained below.

The phase1 string counters of received data bits, run in parallel with the 1PPS, and perform listed below functions.

During a phase 1 string reception, before a string end is reached, number of sampling clock cycles contained in incoming sub-intervals is being counted for a preliminary estimate of received bits number.

Additionally to said counting of the sub-intervals clock cycles, any positive/negative correction of the 1PSA1 is followed by immediate adding/subtracting 1 to/from the counted string bit number.

When the end of a current phase1 string is reached, and final content of the phase1 edge skew register2 (1ESR2) and the phase1 skew accumulation register1 (1PSA1) are added in the phase1 final skew register (1FSR), and the 1FSR content is verified for being in the range of –2/–1/0/+1/+2 data bits: the corresponding –2/–1/0/+1/+2 bits are added to the counted number of string's data bits.

The phase2 string counters are similar to the phase1 string counters: but run in parallel with the 2PPS, and perform similar functions for phase2 strings as the phase1 string counters do for phase1 strings.

The phases 1&2 data merging circuits are common for both phases 1&2, and are run by phase1 clocks 12-14 (1Clk12-1Clk14) which follow all the above described operations of the phase1 and phase2 string counters.

The data merging circuits perform functions described below:
- merging data, which are contributed by incoming irregular phase1 and phase2 data strings, into a two byte long 16 bit data collection register (DCR);
- whenever a merger of a first/second DCR byte is completed a signal completed first (Cf)/completed second (Cs) is send to the PCU, which downloads the newly available byte to its internal data register;
- the next byte is being filled with incoming data based on a content of said phase1 and phase2 string counters, and after the filling is completed its completion signal is send to the CPU as well and the original byte filling is resumed.

More detailed implementations of the above operations, by the RDC circuits, are described below.

The phase1 string counter buffer6(1SCB6), counts the number of a string sampling clocks by adding numbers of sampling clocks in incoming string sub-intervals, as it is defined below.

If 1SIN6ena&1Fe6ena=1 indicate a string front sub-interval which is contained in a single sampling cycle, 0 is added;

If (1SIN6ena=0)&(1Fe6ena=1) indicate a string front subinterval which is not contained in a single sampling cycle, or the 1SIN6ena&1ESR1(E)=1 indicate a single cycle sub-interval at the end of string or a single cycle string: 1 is added.

In all the other cases: 2 is added.

The phase1 string counter buffer7 (1SCB7) does not contribute any bit numbers, if a positive or negative overflow is not reached by the phase1 periodical skew accumulator1 1PSA1.

When the positive/negative overflow in the 1PSA1 is signaled by the 1PSA1(Op)=1/1PSA1(On)=1: +1/−1 is added to a content of the 1SCB6 and a resulting sum is loaded into the 1SCB7.

The phase1 string counter buffer8 (1SCB8) and the phase1 string counter buffer9 (1SCB9), do not contribute any bit numbers until string end is reached.

When the end of the string is signaled by the 1SCB7(E)=1/1SCB8(E)=1, the 1SCB8/1SCB9 are modified as it is explained below.

If the 1FSR(P)=1/0 signals positive negative content in the 1FSR, +1/−1 is added to a content of the 1SCB7 and a resulting sum is loaded into the 1SCB8.

If the 1DLR(P)=1/1SLR(P)=0 signals positive 1DLR content/negative 1SLR content, +1/−1 is added to a content of the 1SCB8 and a resulting sum is loaded into the 1SCB9.

If the 1SCB9(D)=1 indicates the above explained double edge condition at the end of a string; 1 is added to 1SCB9 and the sum is downloaded to the phase1 string counter buffer10 (1SCB10) which is downloaded further to the phase1 counter buffer11 (1CB11).

The resulting 1CB11 contains a data bits number, which corresponds to a sub-interval received during the last phase1 cycle.

The phase2 string counter buffer9 (2SCB9), which is downloaded from phase2 circuits which are identical to the proceeding the 1SCB9 phase1 circuits, is further downloaded to the 2SCB10.

The sum 2SCB10(S:0)+2SCB10(D) is further added to the 1SCB10, and the resulting final sum is loaded into the phase1+2 counter buffer11 (1+2CB11).

The resulting 1+2CB11 contains a data bits number which corresponds to a sub-interval received during the last phase1 cycle, plus a data bits number which corresponds to a sub-interval received during the last phase2 cycle.

The 1PE10/2PE10 control signals of the 2:1 SEL on the input of the 1SCB10/2SCB10, assure that zeroes are downloaded when phase1/phase2 has been inactive.

Further RDC stages 12-14 provide the data merging functions, which include converting content of the 1CB11 and the 1+2CB11 into a corresponding sequence of data bits having signal levels recovered from the L bits, as it is further explained below.

The front pointer register (FPR), which contains a pointer to the beginning of new phase1 sub-interval data bits: is loaded from the phase2 pointer register (2PR), which contains a pointer to the end of previous phase2 sub-interval data bits.

The phase1 pointer register (1PR), which contains a pointer to the end of new phase1 sub-interval data bits, is loaded with the sum: the previous phase2 pointer register (2PR) plus the number of new phase1 sub-interval bits from the 1CB11.

The phase2 pointer register (2PR), which contains a pointer to the end of the new phase2 sub-interval data bits, is loaded with the sum: the previous phase2 pointer register (2PR) plus the total number of phase1 and phase2 new sub-interval bits from the 1+2CB11.

During the above defined pointers calculations; crossing of a first/second byte boundary is always being checked for, and if detected produces the completed first/second Cf/Cs bit which is loaded into appropriate pointer register.

Said pointers are further processed by the phase1 range activation arithmometer (1Ran.Act.Ar.) and phase2 range activation arithmometer (2Ran.Act.Ar.), which convert pointers content into strings of 1s/0s corresponding to received/absent data bits, as it is further explained below.

The 1Ran.Act.Ar. subtracts the FPR from the 1PR and provides a series of 0s and 1s: which is filled with 0s up to the position defined the 1FRO, followed by 1s which fill the positions from the FRO up to the 1PR, and has the number of is equal to the binary number equal to 1PR−FRO.

The 2Ran.Act.Ar. subtracts the 1PR from the 2PR and provides a series of 0s and 1s: which is filled with 0s up to the position defined the 1PR, followed by 1s which fill the positions from the 1PR up to the 2PR, and has the number of is equal to the binary number equal to 2PR−1PR. Said outputs of the 1Ran.Act.Ar./2Ran.Act.Ar. are downloaded into the phase1 range activation register (1RAR)/phase2 range activation register (2RAR).

The 1RAR/2RAR is followed by the phase1/phase2 last active bit decoder (1Las.Act.Dec.)/(2Las.Act.Dec.) which sets 1 on the output bit which corresponds to last active bit, if the existence of the double edge data bit is signaled by the 1RAR(D)=1/2RAR(D)=1.

The straight and inverted outputs of the 1RAR are applied to the data inputs and to the control inputs of the 2:1 SEL and the outputs of the 1Las.Act.Dec. are applied to the control inputs of the 2:1 SEL, in order to produce the 1DATsel(15:0) outputs as it is defined below.

Any particular output bit of the 1DATsel is set to a level which is defined by the L, if a corresponding 1RAR bit is active 1 and the corresponding 1Las.Act.Dec. bit is inactive 0.

Any particular output bit of the 1DATsel is set to a level which is defined by the reversed L, if a corresponding 1RAR bit is active 1 and the corresponding 1Las.Act.Dec. bit is active 1.

The 2DATsel works the same way as the 1DATsel and is driven identically by the 2RAR and the 2Las.Act.Det.

The outputs of the 1DATsel/2DATsel are applied to the data inputs of the 3:1 SEL and the outputs of the 1RAR/2RAR are applied to the control inputs of the selector, in order to select the 1DATsel/2DATsel bits which correspond to the active outputs of the 1RAR/2RAR.

Since the data collection register (DCR) bits will be selected for all the 3:1 SEL outputs which correspond to inactive 1RAR bits and 2RAR bits, the content of the 1DATsel, the 2DATsel is merged with the previous content of the DCR.

Finally the DCR bit DCR(Cf)/DCR(Cs) is used to request the PCU to read the first/second completed byte of received data, while the complimenting second/first DCR byte is being filled with next data bits.

7. Data Frequency Capturing

The above described PSA circuits allow the PCU to correct the effects of frequency differences between a frequency of incoming data stream and a frequency of the sampling clock, if said frequency differences are measured and communicated to the PCU.

The purpose of the Data Frequency Capturing circuits is; to measure sampling clock phase interval between active edges of the incoming signal and corresponding number of data bits, and to communicate the measurements to the PCU.

Measuring sampling clock phase intervals per a fixed number of corresponding data bits would be the most convenient way to conduct said frequency measurements.

Since unknown lengths of incoming data strings exclude such possibility, a best possible compromise is implemented as it is explained below.

Sampling clocks are counted by the modulo 16 counter equipped with zero content decoder, which generates a zero signal at the end of every 16 clock measurement period.

Sampling clock phase is captured for every last active edge of the incoming signal before the end of the measurement period.

Sampling clock phase interval between; last active edge of the incoming data signal before the end of the penultimate measurement period, and last active edge of the data signal before the end of the last measurement period: is captured and transferred to the PCU following every end of the measurement period.

Corresponding number of data bits received between the penultimate captured active edge and the last captured active edge, is captured and transferred to the PCU following every end of the measurement period.

Circuits which implement said Data Frequency Capturing (DFC) are shown in FIG. 3D, and more detailed description is given below.

Said 16 clock counter is implemented by the clock counter register (CCR(3:0,Z)) with the double clock arithmometer (Dou.Clk.Ar.) and the zero decoder (Zero Dec.).

Since every 1Clk5 cycle corresponds to 2 sampling clock cycles, 2 is added to CCR content at every 1Clk5 cycle for achieving the 16 cycle measurement period.

Every said captured phase interval consists of: a whole number of sampling periods which are counted between the interval edges, plus a fraction of the sampling period which is expressed by a number of delays between sampling subclocks which captured the interval edges.

Said fractional phase component is measured, as it is further explained below:
every last active edge in the phase1 cycle is captured in the active edge register (AER) from the last active 1SER/2SER, if the (1SER(E)=1)&(2SER(E)=0)/(2SER(E)=1) accordingly;
the CCR(Z)=1 which indicates the end of the measurement period, captures the last edge before the end of the measurement period, in the last edge register (LER);
the next CCR(Z)=1 reloads the LER to the penultimate edge register (PER);
the edge difference arithmometer (EdgeDif.Ar.) subtracts the PER from the LER, and the resulting difference is loaded to the edge difference register (EdgeDif.Reg.).

Said whole number component is measured, as it is explained below:
every last active edge in the phase1 cycle loads said CCR content into the active edge counter register (ACR), if the last edge comes in the first sampling clock cycle of the sampling clock cycle;
every last active edge in the phase1 cycle loads said CCR content plus 1 into the active edge counter register (ACR), if the last edge comes in the second sampling clock cycle of the sampling clock cycle;
any of the two above mentioned active edges loads 1 to the ACR(A) bit, which indicates presence/absence of any active edge during the measured phase interval if set to 1/0 accordingly;
said CCR(Z) bit prevents the ACR(A) bit from the previously measured phase interval to be carried forward to the next measured phase interval;
the CCR(Z)=1 which indicates the end of the last measurement period, captures said whole number of sampling cycles between the beginning of the measurement period and the last active edge before the end of the period, in the last clock register (LCR);
the next CCR(Z)=1 reloads the LCR to the penultimate clock register (PCR);
the clock difference arithmometer (Clk.Dif.Ar.) subtracts the PCR from the LCR and adds 16 to a result of the subtraction;
the output of the Clk.Dif.Ar is loaded to the clock difference register (CDR).

The EDR((T:0) and the CDR(4:0,A,Z) are send to the PCU, where the CDR(Z) and the CDR(A) have the meaning which is defined below:
the CDR(Z) requests the PCU to read the content of the EDR((T:0) and the CDR(4:0,A);
the CDR(A)=1/0 means that there was/wasn't any active edge during the measured phase interval;
consequently the PCU shall integrate the last measured interval having said A=1 with all the following it intervals having A=0 and with the first following them interval having A=1, into a single measurement interval;
PCU shall assemble a corresponding number of data bits received between the penultimate captured active edge and the last captured active edge, as equal to a sum of all data bits numbers which were captured for all the above explained integrated measurement periods.

Since longer intervals are less reliable:
smaller weights could be assigned to longer intervals by PCU algorithms, which calculate phase & frequency errors and implement the DPLL functions for controlling incoming signal reception process through the SIR values.
and/or longer intervals measurements could be eliminated by said PCU algorithms.

Said number of data bits, which corresponds to the captured phase interval, is measured by calculating listed below entities and adding them together, as it is explained below:

a number of data bits received between the front edge of the captured phase interval and the end of the penultimate measurement period, is calculated and loaded into the front range register (FRR);

a number of data bits received between the beginning of the last measurement period and the end edge of the captured phase interval and, is calculated and loaded into the front range register (ERR);

in order to identify phase1 cycles which correspond to the end of the said measurement period, the CDR(Z) bit which is set by the 1Clk7, is downloaded by the consecutive phase1 clocks from 1Clk8 to 1Clk14 into the Z8 to Z14 timing status bits, which propagate the end of the period status information from the $8^{th}$ to $14^{th}$ stage of the SDR MSP;

the FRR and the ERR are added by the total range arithmometer (Tot.Ran.Ar.) and the result is loaded into the total range register (TRR), when Z13 indicates the end of the last measurement period;

said Z14=1 is send to the PCU and requests the PCU to read the TRR. Said end range calculations are implemented, as it is explained below:

at the end penultimate measurement period, the whole end range buffer1 (ERB1(4:0,A) including the active edge indicator (ERB1(A)) is pre-loaded to 0 by the Z11;

during the last measurement period, the ERB1(4:0) keeps accumulating number of data bits collected in the 1+2CB11 and the ERB1(A) keeps accumulating the active edge detection sum 1E+2E;

if (1+2CB11(E)=1)/(1+2CB11(E)=0)&(1CB11(E)=1) occurs, which indicates that the last active edge occurred during phase2/phase1, the ERB1+(1+2CB11)/ERB1+1CB11 accordingly is loaded to the end register buffer2 (ERB2);

else if (Z11=1)&(ERB1(A)=0) occurs, which indicates that there was no any active edge during the last measurement period, the ERB1+(1+2CB11) is loaded to the end register buffer2 (ERB2);

at the end of the last measurement period, the ERB2 is loaded to the ERR by the Z12.

Said front range calculations are performed, as it is explained below:

the ERB1+(1+2CB11) is loaded to the measurement period buffer (MPB) by the Z11, consequently the MPB shall contain the number of all the data bits which were collected during the whole measurement period;

the ERB2 is subtracted from the MPD and the difference is loaded into the front range buffer (FRB) by the Z12, consequently the FRB shall contain the number of all the data bits which were collected between the last active edge of the penultimate measurement period and the end of the penultimate period;

if there was not any active edge during the penultimate period; the ERB=MPB and the FRB=0;

the FRB is re-loaded into the front range register (FRR) by the next Z12, in order to make the FRB content available, together with the ERR of the last measurement period, for the total range calculation.

It shall be noticed that: if there was no any active edge during the last measurement period, the above explained CDR(A)=0 indicator communicates to the PCU that the current data string did not end yet and it continues into the next measurement period.

Therefore the PCU shall accumulate the newly received number of data bits with numbers of data bits which belong to the same measured interval, which were/will be received in the past/future measurement periods.

8. Wave-Form Screening and Capturing (WFSC)

The wave-form screening and capturing of screened out cases (WFSC) is performed by the circuits which are shown in FIG. 4A and the timing diagrams of the WFSC are shown FIG. 4B.

The WFSC allows the PCU to perform screening and capturing of the incoming signal, for timing intervals which correspond roughly to a period of a single data bit, based on a content of the wave buffers 11WB, 12WB, 21WB and 22WB.

The WFSC allows the PCU to screen signal quality of incoming wave form, by applying programmable screening functions using programmable data masks, as it is listed below:

content of said wave buffers can be verified for compliance or non compliance with a mask provided by the PCU, based on verification functions and verification tolerances which are programmed by the PCU;

if any wave buffer verification detects preset by PCU screening out criteria to be met, the corresponding content of a wave buffer is captured and made available for PCU for further analysis;

in addition to the wave buffer capturing, a number of said screened out results will be counted and communicated to the PCU as well.

In addition to the above mentioned screening; the WFSC allows also the PCU to select arbitrarily a content of any of the wave buffers during any particular time slot; for being captured and made available for analysis by the PCU.

The above mentioned signal screening is implemented by the WFSC, as it is explained below. The Mask Detection Arithmometrs (11MDA and 12MDA) for the WFSC are positioned similarly as the DFAs of the SMS-DSP.

The second stage uses the mask detection arithmometers 11MDA/12MDA for identifying wave-forms which are beyond usually acceptable range defined by the PCU.

The programmable control unit (PCU) determines logical and/or arithmetical processing which the 11MDA/12MDA shall perform, by pre-loading the detection control register (DCR) with a control code applied as the DCR(P:0) to the 11MDA/12MDA.

Additionally the PCU determines the mask DMR(R:0) which the captured data 11WB(R: 0)/12WB(R:0) shall be processed against, by pre-loading the detection mask register (DMR). The 11 SEL signal equal to 1/0 selects; the 11WB (R:0)/12WB(R:0) to be downloaded to the phase one detected data buffer (1DDB) by the clock 1Clk2 (see FIG. 4A and FIG. 4B), if the 11DET/12DET indicate detection of a pre-selected mask by the mask detection arithmometer 11DMA/12DMA.

At the beginning of the next time frame, which has 128 phase1 cycles, the last captured 1DDB content is further downloaded to the phase1 data register (1DDR) by the clock signal 1Clk3/128. Number of said mask detections is counted in the mask counter buffer (1MCB), as it is explained below:

at the beginning of every time frame which has 128 phase1 cycles, the 1MCB is reset/preset to 0/1 if there isn't/is a mask detection for the first cycle of the frame which is signaled by the 1PHA/128*ena*=1;

the 1MCB is increased by 1/kept the same, if there is/isn't any mask detection during a particular phase1 cycle;

at the beginning of the next time frame, the 1MCB is downloaded to the phase1 mask counter register (1MCR) and the output of the 1MCB>0 decoder (MCB>0 DEC) is downloaded to the 1MCR(P) bit, by the 1Clk3/128.

Said 1DDR and 1MCR are read by the PCU, when the beginning of the next frame is communicated to the PCU by the phase1 $128^{th}$ clock enable signal (1PHA/128*ena*) and the above mentioned 1MCR(P)=1 indicates that at least 1 detection of a pre-selected mask occurred during the previous frame.

Said PCU controlled capturing of a wave buffer content is implemented, as it is explained further below.

The sample number register (SNR) is loaded by the PCU: with a phase number defined as phase1/phase2 if the SNR(0) is set 0/1, and with a particular phase cycle number in a time frame defined by SNR(7:1) bits.

Since there are 2 phases with 128 cycles per time frame, SNR(7:0) bits define 1 of 256 sampling cycles for having its wave buffer captured and made available for a further analysis by the PCU.

Said SNR is downloaded into the phase1 sample number buffer (1SNB) at the beginning of a time frame by the first phase1 clock of the frame 1Clk2/128.

At the beginning of a time frame: the phase1 sample number counter (1SNC) is set to 0, since the 1PHA/128*ena* selects 0 to be loaded into the 1SNC by 1Clk2.

During every other cycle of the time frame: 1 is added to the SNC content, since the 1PHA/128*ena* is inactive during all the next cycles of the frame.

The 1SNC(7:1) and the 1SNB(7:1) are being compared by the logical comparator (Log.Comp.), which produces the Eq=1 signal when their identity is detected.

Said Eq=1 enables the 1SNB(1)=0/1 to select the 11WB(R:0)/12WB(R:0) in the 3:1 selector (3:1 SEL), for capturing in the phase1 sampled data buffer (1SDB).

At the beginning of the next time frame, the output of the 3:1 SEL is additionally captured in the phase1 sampled data register (1SDR) by the signal 1Clk3/128.

Said 1SDR is read by the PCU, which is notified about availability of the requested sample by the signal 1PHA/128*ena*.

Conclusion

In view of the above description of the invention and associated drawings, other modifications and variations will now become apparent to those skilled in the art based on the teachings contained herein. Such other modifications and variations fall within the scope and spirit of the present invention.

What is claimed is:

1. A method of real time processing supported by a programmable control unit (RTP PCU), wherein sequential processing stages (SPS) operating at frequencies related to a frequency of a clock of a received signal are supported by the programmable control unit (PCU) in order to detect transitions of the received signal and recover data transmitted by the received signal; wherein such RTP PCU method comprises the steps of:

using the SPS for said real time processing of the received signal wherein the SPS is driven with clocks having a known frequency relation to the received signal clock;

using the PCU for supporting adaptive operations based on the real time processing performed by the SPS, wherein signals presenting results of the real time processing are sent by the SPS to the PCU and the results of the real time processing are analyzed and responded by the PCU by defining processing functions applied or supplying processing arguments used in the real time processing;

using the SPS for detecting the transitions of the received signal and estimating phases of the received signal transitions;

recovering the data transmitted by the received signal by utilizing the phases of the received signal transitions, wherein the recovery of the data is based on the known frequency relation.

2. A method of real time processing supported by a programmable control unit (RTP PCU), wherein sequential processing stages (SPS) operating at frequencies related to a frequency of a clock of a received signal are supported by the programmable control unit (PCU) in order to detect transitions of the received signal and recover data transmitted by the received signal; wherein such RTP PCU method comprises the steps of:

using the SPS for said real time processing of the received signal wherein the SPS is driven with clocks having frequencies equal to a frequency of a local clock or multiplications or divisions of the local clock frequency, wherein there is a known frequency relation between the local clock and the received signal clock;

using the PCU for supporting adaptive operations based on the real time processing performed by the SPS, wherein signals presenting results of the real time processing are sent by the SPS to the PCU and the results of the real time processing are analyzed and responded by the PCU by defining processing functions applied or arguments used in the real time processing;

using the SPS for measuring intervals between the transitions of the received signal with the local clock;

using the known frequency relation for correcting the intervals measured with the local clock to intervals defined by the received signal clock;

using the intervals defined by the received signal clock for recovering the data transmitted by the received signal.

3. A method of real time processing supported by a programmable control unit (RTP PCU), wherein sequential processing stages (SPS) operating at frequencies aligned to a frequency of a clock of a received are supported by the programmable control unit (PCU) in order to recover data transmitted by the received signal; wherein such RTP PCU method comprises the steps of:

using the SPS for the real time processing of the received signal wherein the SPS is driven with clocks having frequencies equal to a frequency of a local clock or multiplications or divisions of the local clock frequency;

using the PCU for supporting adaptive operations based on the real time processing performed by the SPS, wherein signals presenting results of the real time processing are sent by the SPS to the PCU and the results of the real time processing are analyzed and responded by the PCU by defining processing functions applied or arguments used in the real time processing;

using the SPS for measuring times of transitions of the received signal wherein the transition times are related to the local clock;

using the transition times and a number of corresponding data bits in the received signal for measuring a frequency relation between the local clock and the received signal clock;

using the measured frequency relation for producing a specific said local clock which is aligned in frequency to the received signal clock;

using the SPS for measuring specific times of the received signal transitions wherein the specific transition times are related to said specific local clock;

using the specific transition times for recovering the data transmitted by the received signal.

4. An RTP PCU method as claimed in claim 1, wherein:
an output of a one of said sequential processing stages is fed back to an input of the same stage in order to supply an argument for a one of this stage operations performed later,
or an output of a one of said sequential processing stages is retained over a next operation or next operations, in order to be used in a non-consecutive later operation performed by an other one of said sequential processing stages.

5. An RTP PCU method as claimed in claim 1, further comprising utilization of multiple said SPS combined into a configuration of parallel processing phases; wherein such RTP PCU method comprises the steps of:
driving the parallel processing phases with clocks synchronous to a local clock wherein consecutive said parallel processing phases are driven by the synchronous clocks shifted in time by one or more periods of the local clock;
passing outputs of a one of said parallel processing phases to a next one of said parallel processing phases in order to use the passed outputs for processing conducted by a following one of said sequential processing stages of the next one parallel processing phase,
wherein the outputs passing is performed by re-timing output register bits of the one parallel processing phase by clocking them into an output register of the next one parallel processing phase simultaneously with processing results of the next one parallel processing phase;
wherein the outputs passing of the one parallel processing phase to the next one parallel processing phase, enables processing of the received signal having a wider frequency range.

6. An RTP PCU method as claimed in claim 5, further comprising merging of the parallel processing phases; the RTP PCU method comprising the step of:
merging multiple said parallel processing phases into a single processing phase, when passing from a one of said sequential processing stages to a next one of said sequential processing stages,
wherein a clocking frequency of the merged single processing phase equals to a sum of clocking frequencies of said multiple parallel phases which are clocked into the merged single processing phase.

7. An RTP PCU method as claimed in claim 5, further comprising splitting of the parallel processing phases; the RTP PCU method comprising the step of:
splitting a particular one of said parallel processing phases into particular said parallel processing phases, when passing from a one of said sequential processing stages to a next one of said sequential processing stages;
wherein a sum of clocking frequencies of the split said particular parallel processing phases of the next one sequential processing stage, equals to a clocking frequency of the particular one parallel processing phase which is split into the particular parallel processing phases of the next one sequential processing stage.

8. An RTP PCU method as claimed in claim 5, comprising utilization of the parallel processing phases for filtering noise out of the received signal; the RTP PCU method comprising the steps of:
clocking-in a carry over part of an output register of a first filter stage of the one parallel processing phase into an output register of a first filter stage of the next one parallel processing phase together with filtering results of the next one parallel processing phase;
using the clocked in carry over part by a second filter stage of the next one parallel processing phase, for filtering noise out from a wave-form of the received signal which extends beyond the one parallel processing phase.

9. An RTP PCU method as claimed in claim 1, comprising utilization of a particular one of said sequential processing stages for filtering noise out of the received signal; the RTP PCU method comprising the steps of:
using the PCU for determining a mask or a control code for the particular one sequential processing stage;
using the mask for correcting a waveform of the received signal processed or the control code for determining an operation performed by the particular one sequential processing stage in order to filter noise out of the received signal.

10. An RTP PCU method as claimed in claim 1, comprising use of the PCU for supporting programmable or adaptive signal processing algorithms; the RTP PCU method comprising the steps of:
using the sequential processing stages for a real time capturing and the real time processing of the received signal;
using the PCU for
reading the captured received signal or results of the real time processing of the received signal from the sequential processing stages,
analyzing the captured received signal or the results of the real time processing and defining processing functions applied or arguments used in the sequential processing stages,
in order to support said programmable or adaptive signal processing algorithms.

11. An RTP PCU method as claimed in claim 1, the RTP PCU method further comprising:
screening and capturing of the received signal with a waveform screening and capturing circuit (WFSC) controlled by the PCU.

12. An RTP PCU method as claimed in claim 11, the RTP PCU method further comprising:
using the WFSC for verification of the captured received signal for a compliance or non-compliance with programmable patterns and for buffering a particular said captured received signal for which the compliance or non-compliance has been detected;
wherein the programmable patterns are provided by the PCU and the buffered received signal is read by the PCU.

13. An RTP PCU method as claimed in claim 11, wherein operations of the WFSC further comprise:
selecting a time interval for which the captured received signal shall be buffered in order to be communicated to the PCU;
wherein the selection of the time interval is programmed by the PCU and the buffered received signal is read by the PCU.

14. An RTP PCU method as claimed in claim 1, wherein:
the sequential processing stages use selectors or arithmometers or output registers or input registers.

15. An RTP PCU method as claimed in claim 1, further comprising use of multiple parallel processing stages; wherein:
the multiple parallel processing stages performing different logical or arithmetical operations, are driven by the same clock which is applied simultaneously to the multiple parallel processing stages.

16. An RTP PCU method as claimed in claim 2, including a correction of cumulative errors, in the intervals measured with the local clock, caused by periodical phase skews;

wherein the step of using the known frequency relation for correcting the intervals measured with the local clock, further comprises the steps of:

using said known frequency relation to calculate specific said periodical phase skews expected between periods of the local clock and periods of the received signal clock;

using said specific periodical phase skews occurring during a particular one of said intervals measured with the local clock for correcting the particular one interval to a corresponding one of said intervals defined by the received signal clock.

17. An RTP PCU method as claimed in claim 2, wherein said correcting the intervals measured with the local clock includes utilization of a fractional bit staffing (FBS) method for calculating and using periodical phase skews for correcting cumulative errors in the intervals measured with the local clock; wherein such RTP PCU comprises the steps of:

using the known frequency relation to calculate said periodical phase skews expected between periods of the local clock and periods of the received signal clock, wherein a set of said periodical phase skews is calculated as a series of less significant parts of terms used in cumulative processing operations wherein each one of said terms consists of a more significant part defined by a more significant bit or bits which shall be constant for all said terms and a one of said less significant parts defined by a less significant bit or bits which can be different for consecutive said terms;

using the periodical phase skews occurring during a particular one of said intervals measured with the local clock for correcting the particular one interval to a corresponding one of said intervals defined by the received signal clock.

18. An RTP PCU method as claimed in claim 2, including a correction of cumulative errors, in the intervals measured with the local clock, caused by periodical phase skews; wherein the step of using the known frequency relation for correcting the intervals measured with the local clock, further comprises the steps of:

using the known frequency relation to calculate said periodical phase skews expected between periods of the local clock and periods of the received signal clock;

calculating an accumulation of the periodical phase skews during a particular one of said intervals measured with the local clock;

using the calculated accumulation for correcting the particular one interval measured with the local clock to a corresponding one of said intervals defined by the received signal clock.

19. An RTP PCU method as claimed in claim 18, further comprising the steps of:

reading a next set of the periodical phase skews from the PCU and attaching them to a present set of the periodical phase skews read earlier by a part of the SPS which uses the present set and the next set for the calculating the accumulation of the periodical phase skews;

synchronous loading of the calculated accumulation to an other part of the SPS which uses the calculated accumulation for the correcting the particular one interval to the corresponding one interval.

* * * * *